(12) United States Patent
Nishiguchi et al.

(10) Patent No.: US 7,700,701 B2
(45) Date of Patent: Apr. 20, 2010

(54) WATER-SOLUBLE POLYMER COMPOUND HAVING SUGAR CHAINS

(75) Inventors: Susumu Nishiguchi, Otsu (JP); Atsushi Toda, Otsu (JP); Shin-Ichiro Nishimura, Sapporo (JP); Kuriko Yamada, Sapporo (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 1116 days.

(21) Appl. No.: 10/556,231

(22) PCT Filed: May 7, 2004

(86) PCT No.: PCT/JP2004/006480

§ 371 (c)(1),
(2), (4) Date: Nov. 8, 2005

(87) PCT Pub. No.: WO2004/099271

PCT Pub. Date: Nov. 18, 2004

(65) Prior Publication Data

US 2006/0287457 A1 Dec. 21, 2006

(30) Foreign Application Priority Data

May 8, 2003 (JP) ............................ 2003-129738

(51) Int. Cl.
*C08F 222/38* (2006.01)
(52) U.S. Cl. .............. 526/307.6; 526/303.1; 526/317.1; 526/319; 435/97
(58) Field of Classification Search ....................... None
See application file for complete search history.

(56) References Cited

U.S. PATENT DOCUMENTS 6,046,040 A * 4/2000 Nishiguchi et al. ............. 435/97

FOREIGN PATENT DOCUMENTS

| JP | 05-500905 | | 2/1993 |
| JP | 10-251287 | | 9/1998 |
| JP | 10251287 A | * | 9/1998 |
| JP | 11-35592 | | 2/1999 |
| JP | 11-42096 | | 2/1999 |
| JP | 2001-40046 | | 2/2001 |
| JP | 2001-220399 | | 8/2001 |
| JP | 2001220399 A | * | 8/2001 |
| JP | 2003-26725 | | 1/2003 |
| WO | 91/16449 | | 10/1991 |

OTHER PUBLICATIONS

Dalkas et al. Polymer 47 (2006) 243-248.*
Liming Dai "Intelligent Macromolecules for Smart Devices" Published by Springer 2003, p. 90.*
Machine Translation of JP 10-251287.*
Machine Translation of JP 2001-220399.*
Ni et al. (Chinese Chemical Letters, 18 (2007), 79-80).*
Nishiguchi et al., "Polymer Preprints," Japan 52:3684-3685, 2003.
Toda et al., "An Engineered Biocatalyst for the Synthesis of Glycoconjugates . . . Protein," Adv. Synth. Catal. 344:61-69, 2002.
Nishiguchi et al., "Highly efficient oligosaccharide synthesis . . . on solid supports," Chem. Commun. pp. 1944-1945, 2001.
Yamada et al., High performance polymer . . . glycoconjugates, Carbohydrate Research 305:443-461, 1998.
Yamada et al., "An Efficient synthesis of Sialoglycoconjugates . . . Support," Tetrahedron Letters 36:9493-9496, 1995.
Nishimura et al., "Chemoenzymatic Oligosaccharide Synthesis . . . Polymeric Carrier," Tetrahedron Letters 35:5657-5660, 1994.
Huang et al., "Homogenous Enzymatic Synthesis . . . Polymer Support," Adv. Synth. Catal. 343:675-681, 2001.
Blixt et al., "Enzymatic glycosylation of reducing oligosaccharides . . . squarate linker," Carbohydrate Research 319:80-91, 1999.
Seitz et al., "Chemoenzymatic Solution- and Solid-Phase . . . Peptides," J. Am. Chem.. Soc., 119:8766-8776, 1997.
Meldal et al., "A PEGA Resin . . . Glycopeptides," J. Chem.. Soc., Chem. Commun. pp. 1849-1850, 1994.
Randall et al., "Solution- and Solid-Phase Synthesis . . . Adhesion," J. Am. Chem.. Soc. 116:11315-11322, 1994.
Schuster et al. "Solid-Phase Chemical-Enzymatic . . . Oligosaccharides," J. Am. Chem.. Soc. 116:1135-1136, 1994.
Sabine Kopper, "Polymer-supported enzymic . . . scale," Carbohydrate Research 265:161-166, 1994.
Kopper et al., "Improved accepter polymers for enzymic glycosylation," Reactive Polymers 22:171-180, 1993.
Zehavi et al., "Polymers having . . . synthase reaction," Carbohydrate Research 228:225-263, 1992.
Zehavi et al., Enzymic Synthesis . . . Polyacrylamide Beads, Carbohydrate Research 124:23-34, 1983.

* cited by examiner

*Primary Examiner*—David Wu
*Assistant Examiner*—Vu Nguyen
(74) *Attorney, Agent, or Firm*—Fish & Richardson P.C.

(57) ABSTRACT

A polymer compound having a monosaccharide or an oligosaccharide residue, or an amino acid or peptide residue bound to a monosaccharide or an oligosaccharide residue bound to a side chain of a water-soluble polymer through a linker containing a selectively cleavable bond, the water-soluble polymer containing 20 to 80 mol % of (meth)acrylic acid residue.

29 Claims, No Drawings

WATER-SOLUBLE POLYMER COMPOUND HAVING SUGAR CHAINS

TECHNICAL FIELD

The present invention relates to a water-soluble polymer compound having sugar chains that is useful for producing glycocunjugates, a method for producing the compound, a method for producing glycoconjugates by using the compound, and a water-soluble polymer primer comprising the compound for synthesizing glycoconjugates.

BACKGROUND OF THE INVENTION

Although carbohydrates are just as important constituents of living bodies as nucleic acids and proteins, their structures and mechanisms are not as well understood as those of nucleic acids and proteins. Carbohydrates frequently form polymers having sugar chain in sequence, and bind with proteins or lipids to form extremely complicated composite molecules, glycoconjugates, which are called glycoproteins, glycolipids, and proteoglycans. Nucleic acids and proteins are polymers wherein constituent units of nucleotides or amino acids are linked to one other linearly. In contrast, carbohydrates have a plurality of intramolecular branch points and their constitutional units, i.e., monosaccharides, are linked to each other in various manners, and therefore carbohydrates have complicated structures incomparable to those of nucleic acids or proteins. This structural complexity is one of the major causes of the delay in the study of carbohydrates.

In recent years, since it has been gradually revealed that carbohydrates have a roll in cell recognition, immunity, differentiation, fertilization, aging, canceration, etc., carbohydrates become a target of study that attracts significant attention. Under such circumstances, many attempts have been made to synthesize a sugar chain having natural structure and a novel sugar chain. Automatic synthesis techniques for nucleic acids and proteins have been already established, and these techniques have obviously accelerated the progress of the researches in these fields. Therefore, the establishment of automatic synthesis techniques for sugar chains have been eagerly desired.

Several attempt for automatic synthesis for sugar chains have so far been reported, and their approaches can be roughly classified into two groups. One employs chemical synthesis, which has many problems such as the fact that stereoselective glycosylation reaction has not been well established, and the process is tedious and complicate because of protection and deprotection. Another employs enzymatic synthesis, which requires no protection, and glycosylation reaction can be carried out stereoselectively. Therefore, compared to chemical synthesis, enzymatic synthesis has many advantages. Several methods have been proposed in recent years. It is due to cloning the genes of various glycosyltransferases and economical production of some recombinant glycosyltransferases. In automatic synthesis, a certain carrier (sometimes referred to as a primer) bound sugar residues, which serve as initiators, through linkers that can be cleaved under specific conditions is used as a starting material. The types of glycoconjugate produced depend on the kind of linkers, and they are released from the carrier as oligosaccharides, glucosides, glycopeptides, glycolipids, etc.

As one of the examples of automatic synthesis method of a sugar chain using glycosyltransferases, U. Zehavi et al. have reported on a solid-phase synthesis method using a polyacrylamide gel bound with an aminoethyl group or an aminohexyl group as a solid-phase carrier (see, for example, Carbohydr. Res., 124(1983), 23; and Carbohydr. Res., 228(1992), 255). This method comprises the steps of converting a suitable monosaccharide to 4-carboxy-2-nitrobenzyl glycoside, condensing this glycoside with amino group of the above carrier, elongating the sugar chain by glycosyltransferase using the condensate as a primer, and releasing the elongated sugar chain as oligosaccharide by photolysis. According to this method, however, sugar transfer yield is low, i.e., less than 10%. It has been a common understanding that glycosyltransferase dose not react well with monosaccharide or oligosaccharide bound to a solid-phase carrier and efficient elongation of sugar chain reaction is difficult to achieve. However, U. Zehavi et al. have documented in a recent report that the sugar transfer yield could be improved up to 51% by using a linker between 4-carboxy-2-nitrobenzyl glycoside and the solid-phase carrier having a long chain such as hexamethylene, and octamethylene, etc. (see, for example, React. Polym., 22(1994), 171; Carbohydr. Res., 265(1994), 161). However, even this method cannot achieve satisfactory yields.

As another example, C.-H. Wong et al. have reported a method wherein a sugar chain is elongated using glycosyltransferases and aminated silica bound a group represented by the following formula

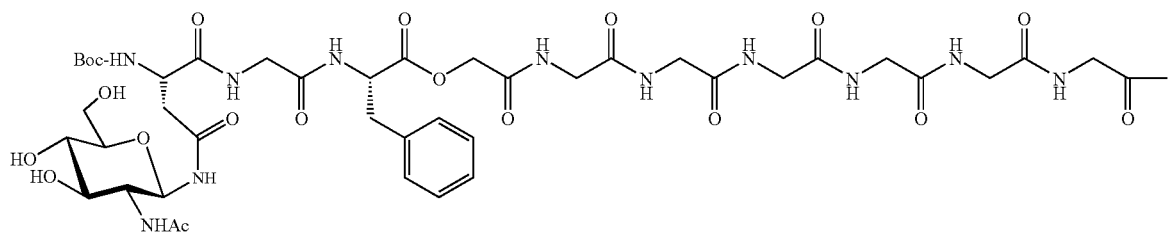

(wherein Ac is an acetyl group and Boc is a t-butoxycarbonyl group) as a primer, and the elongated sugar chain was released in the form of a glycopeptide by hydrolysis of α-chymotrypsin (see, for example, J. Am. Chem. Soc., 116(1994), 1136). However, the yield of sugar-chain elongation reaction using glycosyltransferase is unsatisfactory at 55 to 65%.

Furthermore, C.-H. Wong et al. revised the group to be bound to the solid phase as aminated silica to represented by the following formula

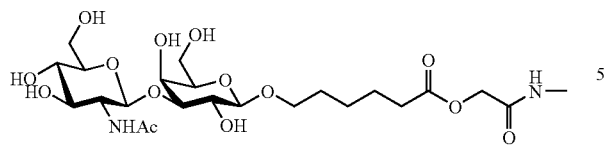

(wherein Ac is an acetyl group) and reported a method wherein the sugar chain was elongated using glycosyltransferases and released by hydrazinolysis. They also reported that the enzymatic glycosylation reaction was proceeded almost quantitatively (see, for example, J. Am. Chem. Soc., 116(1994), 11315). In this method, the elongated sugar chain is released in the form of a 6-carbohydrazide hexanol glucoside.

M. Meldal et al. have reported a method wherein a sugar chain was elongated using glycosyltransferases and a polymer gel of mono- and diacryloyl compound of diaminated poly(ethylene glycol) having a group represented by the following formula

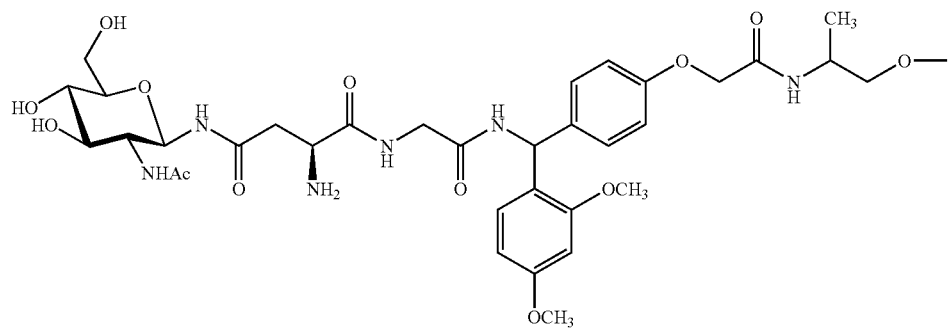

(wherein Ac is an acetyl group) as a primer and the elongated sugar chain was released in the form of a glycopeptide using trifluoroacetic acid. According to their report, the transglycosylation reaction is proceeded almost quantitatively (see, for example, J. Chem. Soc., Chem. Commun., 1849 (1994)). The peptide sequence in the glycopeptide obtained by this method is Asn (asparagine)-Gly (glycine), and the glycine residue at the C-end is a glycinamide residue, and therefore it differs from typical glycopeptides. C.-H. Wong et al. have also reported a method for releasing typical glycopeptides synthesized on a solid-phase carrier. In this method, aminated silica is used as a solid-phase carrier introduced a group represented by the following formula as a primer

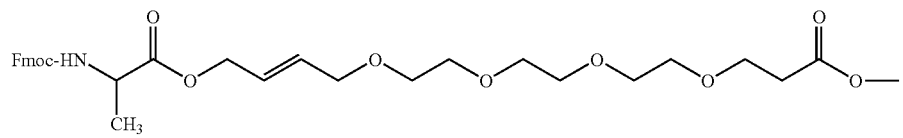

(wherein Fmoc is (9-fluorenylmethyl)oxycarbonyl)), the peptide chain is elongated using Fmoc-amino acids and Fmoc-Thr(βGlcNAc)-OH, after peptide elongation protecting groups on the peptide chain are eliminated, the sugarchain is elongated by glycosyltransferase to the above-men tioned N-acetylglucosamine residue, and resultant glycopeptide is released by tetrakis(triphenylphosphine)palladium treatment (see, for example, J. Am. Chem. Soc., 119(1997), 8766). The yield of the obtained glycopeptide estimated from the amino acid initially introduced to the solid-phase carrier is less that 10%, which is unsatisfactory.

T. Norberg et al. have reported a method wherein a sugar chain was elongated using Sepharose 6B (manufactured by Amersham Pharmacia Biotech) bound a group represented by the following formula as a primer and glycosyltransferase,

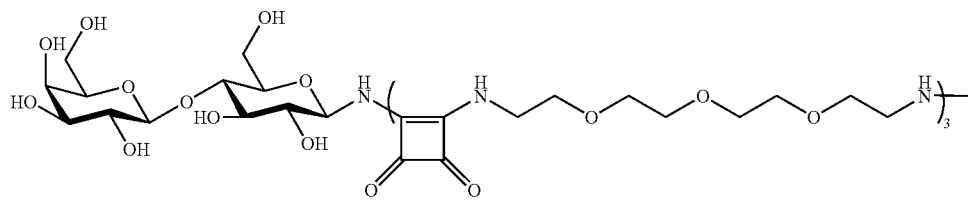

and the elongated sugar chain is released by treatment with bromine or ammonia/ammonium borate (see, for example, Carbohydr. Res., 319(1999), 80). In this method, the enzymatic transglycosylation reaction proceeds quantitatively, so there is no problem with the yield. However, this method is uneconomical because expensive 3,4-diethoxy-3-cyclobutene-1,2-dione is used for producing the primer. The above-described methods have drawbacks such that the transglycosylation reaction yield is unsatisfactory, and/or an immobilized glycosyltransferase cannot be applied since the sugar-chain elongation reaction is carried out on a water-insoluble carrier. In sugar chain elongation by glycosyltransferases, the use of immobilized glycosyltransferases that permit repetitive use are desirable, since glycosyltransferases are still very expensive, though mass production of glycosyltransferases by genetic recombination techniques are becoming available. In order to use an immobilized glycosyltransferase, the sugar-chain elongation reaction should be proceeded not on a water-insoluble carrier but on a water-soluble carrier.

S. Roth et al. have disclosed a method as follows (see, for example, Japanese Unexamined Patent Publication No. 1993-500905). Saccharide, sugar acceptor for a glycosyltransferase, is bound to a solid-phase carrier to form an affinity adsorbent, and a glycosyltransferase is then adsorbed to the above adsorbent by contacting with a tissue extract containing a glycosyltransferase that can recognize the sugar acceptor. Thereafter, the glycosyltransferase transfers sugar residue from sugar nucleotide to the acceptor on the absorbent and elutes from the adsorbent by contacting with a solution containing a sugar nucleotide which the glycosyltransferase can use as a sugar donor. Furthermore, by repetition of contacting the resultant one sugar residue elongated sugar chain on the absorbent with a tissue extract containing another glycosyltransferase that can recognize the elongated sugar acceptor and the similar elution procedure, a desired sugar chain can be synthesized on a solid-phase carrier. However, no concrete data demonstrating the effectiveness of this method is provided. Furthermore, no methods for releasing the elongated sugar chain from the solid-phase carrier are disclosed.

C.-H. Wong et al. have also reported a method for elongating a sugar chain on a water-soluble carrier wherein a water-soluble polymer, acrylamide/acrylic acid/N-isopropylacrylamide copolymer bound a group represented by the following formula to acrylamide residue in this copolymer

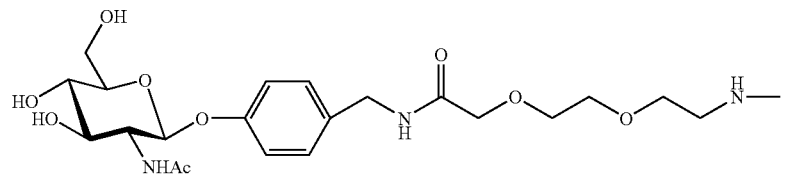

(wherein Ac is an acetyl group) is used as a primer, the sugar chain is elongated by glycosyltransferases and released by the treatment with cerium (IV) diammonium nitrate (see, for example, Adv. Synth. Catal., 343(2001), 675). The proportion of acrylic acid in the copolymer primer used in this method is 4%, and therefore this primer differs from that of the present invention. In this method, the enzymatic transglycosylation reaction progresses at 80 to 90% yield, and the elongated sugar chain is released in the form of a p-formylphenol glucoside. However, this method has drawbacks such that column chromatography using organic solvents is required to purify the released p-formylphenol glucoside, and in some cases obtained p-formylphenol glucoside is not so stable.

The present inventors have reported a method for elongating a sugar chain on a water-soluble carrier wherein polyacrylamide bound a group represented by the following formula

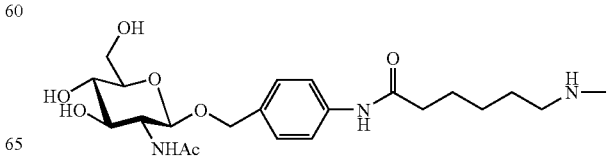

(wherein Ac is an acetyl group) to every fifth amide nitrogen atom in it is used as a primer, the sugar chain is elongated by glycosyltransferases, and the elongated sugar chain is released in the form of an oligosaccharide by hydrogenolysis (see, for example, Tetrahedron Lett., 35(1994), 5657; Carbohydr. Res., 305(1998), 443).

The present inventors have also reported a method for elongating a sugar chain on a water-soluble carrier wherein polyacrylamide bound a group represented by the following formula

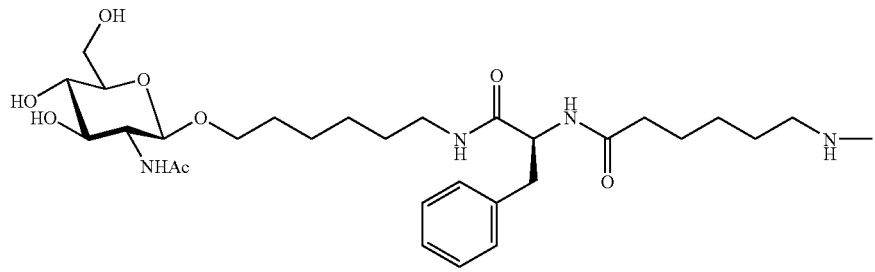

(wherein Ac is an acetyl group) to an amide nitrogen atom of amide moiety is used as a primer, the sugar chain is elongated glycosyltransferases, and the elongated sugar chain is released in the form of a 6-aminohexanol glucoside by hydrolysis of α-chymotrypsin (see, for example, Tetrahedron Lett., 36(1995), 9493; Carbohydr. Res., 305(1998), 443).

According to these reports by the present inventors, glycoconjugates can be efficiently synthesized by free enzymes; however, as described later, when an immobilized enzyme is used, the production efficiency is unsatisfactory. The present inventors have also reported a method for elongating a sugar chain on a water-soluble carrier wherein polyacrylamide bound peptide residue linked monosaccharide residue to functional group on side chain of amino acid in this peptide residue through a linker which has a desired length and comprises an amino acid residue or peptide residue having a cleavage site for a certain protease for example a group represented by the following formula (wherein Ac is an acetyl group) is used as a primer, a certain protease dose not have cleavable site in the above-mentioned peptide which bound directly polyacrylamide, the sugar chain elongation is initiated on the above-mentioned monosaccharide by glycosyltransferases, and the elongated sugar chain is released in the form of a glycopeptide using a appropriate protease hydrolysis (see, for example, Japanese Unexamined Patent Publication No. 2001-220399).

The present inventors have also reported a method which uses a primer comprising a residue represented by the following formula (VIII)

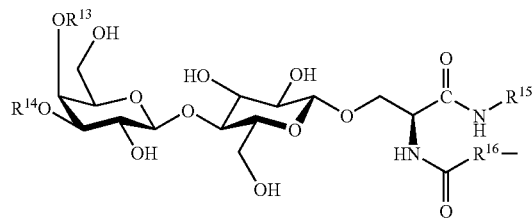

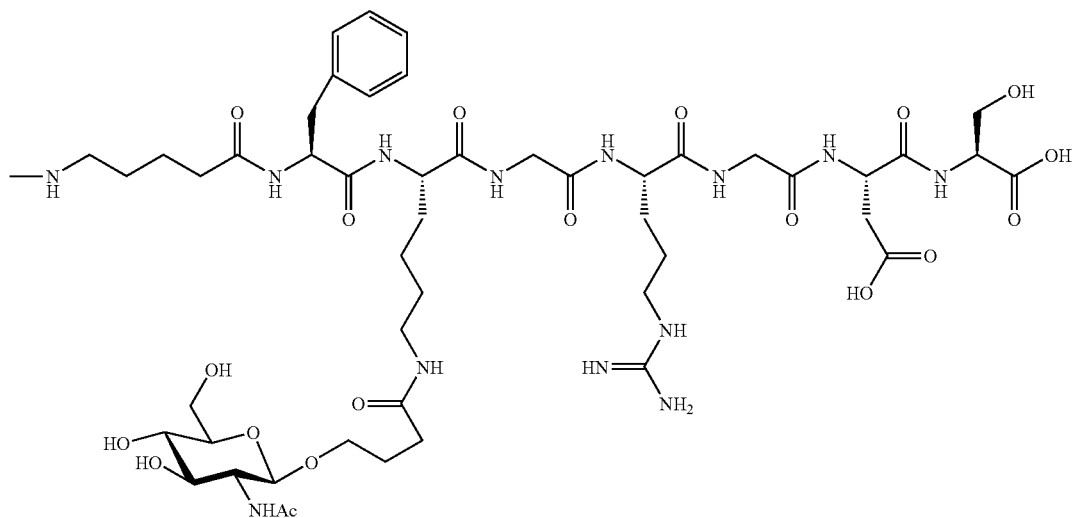

(wherein $R^{13}$ and $R^{14}$ are independently H, a monosaccharide residue or an oligosaccharide residue; $R^{15}$ is a $C_{6-20}$ alkyl group or $C_{6-20}$ alkenyl group; and $R^{16}$ is a $C_{5-19}$ alkylene group) bound to a side chain of a water-soluble polymer. In this method, the sugar chain is elongated by glycosyltransferases, an resultant oligosaccharide residue is transferred in the presence of a ceramid from the polymer having elongated sugar chain to the ceramide by ceramide glycanase, and then liberated as a sphingoglycolipid (see, for example, Japanese Unexamined Patent Publication No. 1998-251287).

In the above-described methods, polyacrylamide is disclosed as one example of water-soluble polymer but no examples are disclosed when acrylic acid is used. Furthermore, when a polyacrylamide is used as a water-soluble polymer, if the transglycosylation reaction is proceeded by immobilized glycosyltransferases, its efficiency is unsatisfactory as described later. If the latter primer is used, when gel filtration chromatography and ultrafiltration are performed to remove by-product nucleotides and unreacted sugar nucleotides after the transglycosylation reaction, recovery of the primer is not always satisfactorily high.

One of the main objects of the present invention is to provide a compound that is suitable and useful as a primer for automatic synthesis of various kinds of glicoconjugates, and a method for producing glycoconjugate using the compound.

DISCLOSURE OF THE INVENTION

The present inventors conducted extensive research and found that the above problems are solved by using a water-soluble polymer as primer which contains 20 to 80 mol % of (meth)acrylic acid-based residues (selected from the group consisting of acrylic acid and salts thereof, and methacrylic acid and salts thereof) and is bound a monosaccharide residue, an oligosaccharide residue, or a peptide to which a monosaccharide residue or an oligosaccharide residue to a side chain of this polymer through a linker containing a selectively cleavable bond. The present invention has been accomplished based on this finding.

In other words, the present invention encompasses the following items.

1. A water-soluble polymer compound having sugar chain(s) comprising a monosaccharide or an oligosaccharide residue bound to side chain(s) of a water-soluble polymer through a linker containing a selectively cleavable bond, the water-soluble polymer containing 20 to 80 mol % of (meth) acrylic acid residue, and the linker being bonded to a repeating unit other than (meth)acrylic acid residue.

2. A compound according to Item 1, wherein amino acid or peptide residues bound to a monosaccharide or an oligosaccharide residue are linked to side chain(s) of the water-soluble polymer through a linker containing a selectively cleavable bond, the water-soluble polymer containing 20 to 80 mol % of (meth)acrylic acid residue, and the linker being bound to a repeating unit other than (meth)acrylic acid residue.

3. A compound according to Item 1 or 2, wherein the water-soluble polymer is a copolymer comprising 20 to 80 mol % of (meth)acrylic acid and 80 to 20 mol % of one or more vinyl monomers selected from the group consisting of acrylamide derivatives, methacrylamide derivatives, acrylic esters, methacrylic esters, styrene derivatives and fatty-acid vinyl esters.

4. A compound according to any one of Items 1 to 3, wherein the selectively cleavable bond contained in the linker can be cleaved by hydrogenolysis or by oxidation using 2,3-dichloro-5,6-dicyanobenzoquinone.

5. A compound according to any one of Items 1 to 4, wherein the linker is a group represented by General Formula (I),

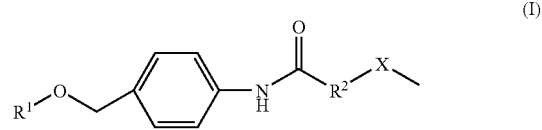

wherein $R^1$ is a monosaccharide or an oligosaccharide residue, $R^2$ is a bivalent linking group with a length equivalent to 4 to 20 methylene groups, and X is O, S, or NH.

6. A compound according to Item 5, wherein $R^1$ is an N-acetylglucosamine residue, a glucose residue or a lactose residue.

7. A compound according to Item 5 or 6, wherein $R^2$ is a pentylene group.

8. A compound according to any one of Items 1 to 7, wherein the linker is a group represented by General Formula (II),

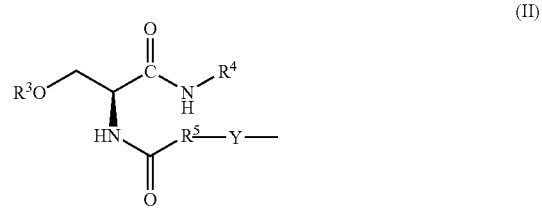

wherein $R^3$ is a monosaccharide or an oligosaccharide residue, $R^4$ is a $C_{6-20}$ alkyl or alkenyl group, $R^5$ is a bivalent linking group with a length equivalent to 5 to 19 methylene groups, and Y is O, S, or NH.

9. A compound according to Item 8, wherein $R^3$ is a glucose or lactose residue.

10. A compound according to any one of Items 1 to 9, wherein the linker is a group represented by General Formula (III),

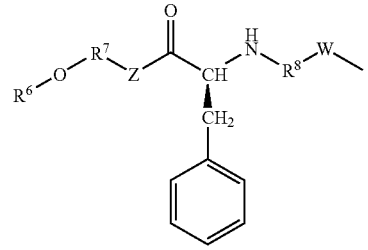

wherein $R^6$ is a monosaccharide or an oligosaccharide residue, $R^7$ is a bivalent linking group with a length equivalent to 2 to 20 methylene groups, $R^8$ is a bivalent linking group with a length equivalent to 5 to 19 methylene groups, and Z and W are each independently O, S, or NH.

11. A compound according to Item 10, wherein $R^6$ is an N-acetylglucosamine residue.

12. A compound according to Item 2, wherein the peptide residue consists of 2 to 30 amino acid residues.

13. A compound according to any one of Items 1 to 12, wherein the selectively cleavable bond contained in the linker can be cleaved by an appropriate hydrolase.

14. A compound according to Item 13, wherein the appropriate hydrolase is ceramide glycanase or α-chymotrypsin.

15. A compound according to Item 13, wherein the appropriate hydrolase is a protease that does not have a cleavage site in amino acid or peptide residue to which a monosaccharide or an oligosaccharide residue is bound.

16. A compound according to Item 15, wherein the linker containing a selectively cleavable bond that is linked to an amino acid or a peptide residue bound to a monosaccharide or an oligosaccharide residue is a group represented by General Formula (IV), $$-R^9-R^{10}- \quad (IV)$$

wherein $R^9$ is a bivalent linking group with a length equivalent to 1 to 20 methylene groups and is linked to the water-soluble polymer compound, and $R^{10}$ is an amino acid or a peptide residue containing a cleavable site by an appropriate protease and is bound to a monosaccharide or an oligosaccharide residue, and that the monosaccharide or oligosaccharide residue is bound to a side chain functional group of Asn, Asp, Cys, Gln, Glu, Lys, Ser, Thr or Tyr residue, or to a side chain functional group of the amino acid residue in a peptide residue directly or through a bivalent linking group via a glycosidic bond.

17. A compound according to Item 16, wherein $R^9$ is a group represented by General Formula (V), $$-A-(CH_2)_n-CO- \quad (V)$$

wherein A is O, $CH_2$, C=O, or NH, the group is linked to a side chain of the water-soluble polymer through A, and n is an integer from 1 to 18.

18. A compound according to Item 16 or 17, wherein the bivalent linking group bound to the side chain functional group is a group with a length equivalent to 1 to 20 methylene groups.

19. A compound according to any one of Items 16 to 18, wherein the bivalent linking group linked to the side chain functional group is a group represented by General Formula (VI), $$-B-(CH_2)_n-O- \quad (VI)$$

wherein B is O, NH, or C=O, the group is linked to the side chain functional group of an amino acid residue through B, and n is an integer from 1 to 18.

20. A water-soluble polymer primer for glycoconjugate synthesis comprising a water-soluble polymer compound having sugar chain(s) according to any one of Items 1 to 19.

21. A method for producing a water-soluble polymer compound having sugar chain(s) comprising a step of copolymerization of (meth)acrylic acid, a (meth)acrylamide derivative represented by General Formula (VII), (VII)

wherein $R^{11}$ is a monosaccharide or an oligosaccharide residue, and $R^{12}$ is a bivalent linking group with a length equivalent to 4 to 20 methylene groups, and at least one vinyl monomer in such a manner that the proportion of the (meth)acrylic acid in the total vinyl copolymers is 20 to 80 mol %.

22. A method according to Item 21, wherein $R^{11}$ is an N-acetylglucosamine residue, a glucose residue, or a lactose residue.

23. A method according to Item 21, wherein $R^{12}$ is a pentylene group.

24. A method according to Item 21, wherein the vinyl monomer is at least one monomer selected from the group consisting of acrylamide derivatives, methacrylamide derivatives, acrylic esters, methacrylic acid esters, styrene derivatives, and fatty acid vinyl esters.

25. A method for producing a glycoconjugate comprising the steps of:

(step 1) transferring a sugar residue from a sugar nucleotide to a polymer compound by contacting a water-soluble polymer compound having sugar chain(s) of Item 1 or 2 with a glycosyltransferase in the presence of a sugar nucleotide, (step 2) elongating the sugar chain by repeating step 1 two or more times if necessary, (step 3) removing by-product nucleotides or unreacted sugar nucleotides if necessary, and (step 4) after repeating steps 1 to 3 two or more times, releasing the resultant glycoconjugate sugar chain from the water-soluble polymer compound which binds the sugar chain elongated by the transfer of the plurality of sugar residues.

26. A method for producing a glycoconjugate compound comprising the steps of:

(step 1) transferring a sugar residue from a sugar nucleotide to a water-soluble polymer compound by the action of a glycosyltransferase to the water-soluble polymer compound having sugar chain(s) of Item 8 in the presence of a sugar nucleotide, (step 2) elongating the sugar chain by repeating step 1 two or more times if necessary, (step 3) removing by-product nucleotides or unreacted sugar nucleotides if necessary and (step 4) after repeating steps 1 to 3 two or more times, transferring the resultant oligosaccharide elongated by transfer of the plurality of sugar residues from the water-soluble polymer compound to ceramide by the action of ceramide glycanase in the presence of ceramide.

Various glycoconjugates can be efficiently synthesized by using the sugar chain-having water-soluble polymer compound of the present invention as a water-soluble polymer primer for glycoconjugate synthesis (which hereunder may be simply referred to as a "primer"), and the primer can be also used for automatic synthesis of glycoconjugates.

The present invention is explained in detail below.

The water-soluble polymer compound having sugar chain(s) of the present invention (which hereunder may be referred to as the "sugar chain-having polymer") is a polymer in which monosaccharide residues or oligosaccharide residues are bound to side chain(s) of a water-soluble polymer through a linker containing a selectively cleavable bond, with the water-soluble polymer usually containing 20 to 80 mol %, preferably 30 to 70 mol %, and more preferably 40 to 60 mol % of (meth)acrylic acid residues as monomers.

In other words, the water-soluble polymer of the present invention contains 20 to 80 mol % of (meth)acrylic acid residues (including carboxyl group salts) represented by the following formulae:

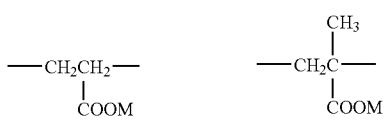

wherein M is a hydrogen atom, an alkali metal (Na, Li, K), ½ an alkaline earth metal (½Ca, ½Mg, ½Ba), ammonium, etc.

Here, the sugar chain is bound to a repeating unit derived from a monomer other than (meth)acrylic acid residue, such as a repeating unit having one of the following structures:

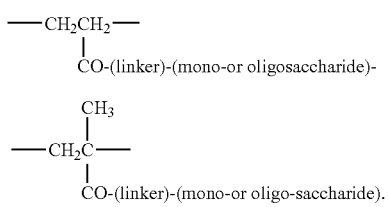

In one preferable embodiment, a linker is linked to a repeating unit derived from acrylic acid or methacrylic acid via an ester linkage (—COO—), an amide linkage (—CONH—), or a thioester linkage (—COS—), and the linker is bonded to a monosaccharide or an oligosaccharide residue through a glycosidic bond.

Examples of monosaccharides include glucose, galactose, mannose, xylose, N-acetylglucosamine, N-acetylgalactosamine, but are not limited to these.

Examples of oligosaccharides include those comprising 2 to 10 of the above-mentioned monosaccharides linked to one another, such as lactose, chitobiose, N-acetyllactosamine, α-2,3-sialyllactose, 3-β-galactosyl-(6-β-N-acetylglucosaminyl)-N-acetylgalactosamine, etc. The oligosaccharide may have a linear structure or have a branched structure in which one sugar residue is bound to two sugar residues.

The sugar chain-having polymer of the present invention is a polymer in which amino acid or peptide residues bound to a monosaccharide residue or oligosaccharide residue are linked to side chains of the water-soluble polymer through a linker containing a selectively cleavable bond. The sugar chain-having polymer contains 20 to 80 mol % of (meth)acrylic acid residues as monomers. The polymer may have a partial structure as below:

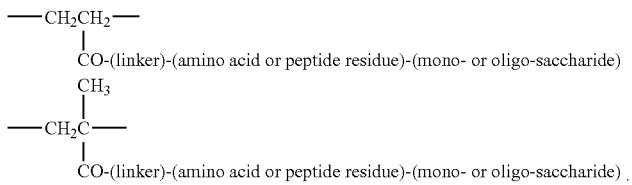

A sugar chain-having polymer whose sugar chain has been elongated by applying the action of a glycosyltransferase is also encompassed in the polymer of the invention if the sugar chain thereof can be further elongated by a glycosyltransferase.

The monomers of the water-soluble polymer other than (meth)acrylic acid (20 to 80 mol %) are not limited and polymers of at least one vinyl monomer selected from the group consisting of acrylamide derivatives, methacrylamide derivatives, acrylic esters, methacrylic esters, styrene derivatives, and fatty acid vinyl esters can be suitably used. Among these, sugar chains of monosaccharides, oligosaccharides, etc., can be bound preferably to acrylamide derivatives, methacrylamide derivatives, acrylic esters, and methacrylic esters through a linker or, if necessary, an amino acid residue or a peptide residue.

Note that acrylamide derivatives, methacrylamide derivatives, hydroxyethyl acrylate and like hydroxyalkyl esters of acrylic acid; dimethylaminoethyl acrylate and like dimethylaminoalkyl esters of acrylic acid; hydroxyethyl methacrylate and like hydroxyalkyl esters of methacrylic acid; dimethylaminoethyl methacrylate and like dimethylaminoalkyl esters are highly water soluble and may be used in a large amount (for example, 70 mol % or more). However, other acrylic esters, other methacrylic esters, styrene derivatives, and fatty acid vinyl esters can be used only in an amount such that the polymer as a whole is water soluble. Acrylamide derivatives, methacrylamide derivatives, hydroxyethyl acrylate and like hydroxyalkyl esters of acrylic acid; dimethylaminoethyl acrylate and like dimethylaminoalkyl esters of acrylic acid; hydroxyethyl methacrylate and like methhydroxyalkyl esters of acrylic acid; dimethylaminoethyl acrylate and like dimethylaminoalkyl esters may be used in an amount calculated by subtracting the amount of (meth)acrylic acid (20 to 80 mol %) and that of the sugar chain-having monomers.

Acrylamide and N-alkylacrylamides such as N-methylacrylamide, N-ethylacrylamide, N-isopropylacrylamide and the like are preferably used as acrylamide derivatives.

Methacrylamide and N-alkylmethacrylamides such as N-methylmethacrylamide, N-isopropylmethacrylamide and the like are preferably used as methacrylamide derivatives.

Methyl acrylate, ethyl acrylate, hydroxyethyl acrylate, dimethylaminoethyl acrylate and the like are preferably used as the acrylic esters.

Methyl methacrylate, ethyl methacrylate, hydroxyethyl methacrylate, dimethylaminoethyl methacrylate are preferably used as methacrylic esters.

Styrene, p-hydroxystyrene and the like are preferably used as styrenes.

Vinyl acetate, vinyl butyrate and the like are preferably used as fatty acid vinyl esters.

Selectively cleavable bonds are not limited as long as the sugar chain compound released after cleavage, such as an oligosaccharide, glycopeptide, sphingoglycolipid, oligosaccharide glucoside, is cleaved without being decomposed, and it is possible that several bonds included in linkers used in solid phase synthesis of peptides or oligonucleotides can be used. For example, bonds cleavable by weak acid or weak alkali, bonds cleavable by hydrogenolysis, bonds cleavable by photoreaction, bonds cleavable by enzymatic reaction, etc., can be used. More preferable examples thereof include hydrogenolysis, oxidation using 2,3-dichloro-5,6-dicyanobenzoquinone, hydrolysis using a protease, transglycosylation of ceramide glycanase, etc.

There is no limitation to monosaccharide or oligosaccharide residue bound to a side chain of the water-soluble polymer through a linker having a selectively cleavable bond. Examples thereof include groups represented by General Formula (I) (wherein $R^1$ is a monosaccharide or an oligosaccharide residue, $R^2$ is a bivalent linking group with a length equivalent to 4 to 20 methylene groups, and X is O, S, or NH), groups represented by General Formula (II) (wherein $R^3$ is a monosaccharide or an oligosaccharide residue, $R^4$ is a $C_{6-20}$ alkyl or alkenyl group, $R^5$ is a bivalent linking group with a length equivalent to 5 to 19 methylene groups, and Y is O, S, or NH), groups represented by General Formula (III) (wherein $R^6$ is a monosaccharide or an oligosaccharide residue, $R^7$ is a bivalent linking group with a length equivalent to 2 to 20 methylene groups, $R^8$ is a bivalent linking group with a length equivalent to 5 to 19 methylene groups, and Z and W are independently O, S, or NH), etc.

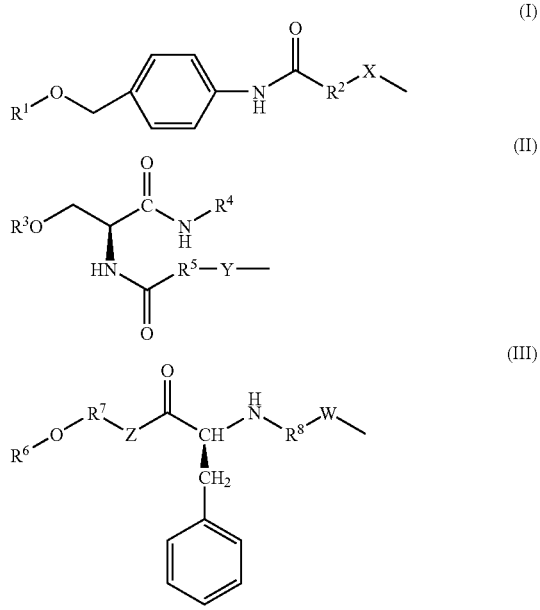

In General Formula (I), all the part except for $R^1$—O— is the linker having a selectively cleavable bond, in General Formula (II), all the part except for $R^3$—O— is the linker having a selectively cleavable bond, and in General Formula (III) all the part except for $R^6$—O— is the linker having a selectively cleavable bond.

Here, such a bivalent linking group with a length equivalent to 4 to 20 methylene groups (preferably a length equivalent to 4 to 18 methylene groups, and more preferably a length equivalent to 6 to 12 methylene groups), a bivalent linking group with a length equivalent to 5 to 19 methylene groups (preferably a bivalent linking group with a length equivalent to 5 to 15 methylene groups, and more preferably a bivalent linking group with a length equivalent to 5 to 11 methylene groups), and a bivalent linking group with a length equivalent to 2 to 20 methylene groups (preferably a bivalent linking group with a length equivalent to 4 to 18 methylene groups, and more preferably a bivalent linking group with a length equivalent to 6 to 12 methylene groups) may consist of methylene residues, or a group in which methylene residues are linked by ether linkages (for example, —(OCH$_2$CH$_2$)$_{n_1}$— wherein $n_1$ is an integer from 1 to 6; however, the length as the whole is equivalent to 4 to 20 methylene groups, 5 to 19 methylene groups, or 2 to 20 methylene groups, with 0 being equivalent to one methylene group). The same applies to other bivalent linking groups in the present specification.

The monosaccharide residue or oligosaccharide residue of $R^1$ is not limited, and examples thereof include glucose residue, galactose residue, mannose residue, N-acetylglucosamine residue, N-acetylgalactosamine residue, xylose residue, lactose residue, N-acetyllactosamine residue, chitobiose residue, etc.

There is no limitation to a bivalent linking group of $R^2$ with a length equivalent to 4 to 20 methylene groups, and, for example, $C_{4-20}$ alkylene groups may be used. Examples of $C_{4-20}$ alkylene groups include butylenes group, pentylene group, heptylene group, dodecylene group, etc.

The monosaccharide or oligosaccharide residue of $R^3$ is not limited, and examples thereof include glucose residue, lactose residue, etc. Specifically preferable examples thereof include β-glucose residue and β-lactose residue.

There is no limitation to the $C_{6-20}$ alkyl group of $R^4$, and hexyl, octyl, dodecyl, octadecyl groups and like linear or branched $C_{6-20}$ (preferably $C_{8-18}$) alkyl groups can be used. There is no limitation to $C_{6-20}$ alkenyl groups and examples thereof include cis-9-octadecenyl and like linear or branched $C_{6-20}$ (preferably $C_{8-18}$) alkenyl groups.

There is no limitation to the bivalent linking group of $R^5$ with a length equivalent to 5 to 19 methylene groups, and examples thereof include $C_{5-19}$ alkylene groups, etc. Examples of $C_{5-19}$ alkylene groups include pentylene group, heptylene group, nonylene group, heptadecylene group, etc.

There is no limitation to the monosaccharide residue or oligosaccharide residue of $R^6$, and examples thereof include glucose residue, galactose residue, mannose residue, N-acetylglucosamine residue, N-acetylgalactosamine residue, xylose residue, lactose residue, N-acetyllactosamine residue, chitobiose residue, etc. Among those, N-acetylglucosamine residue is preferable.

There is no limitation to the bivalent linking group of $R^7$ with a length equivalent to 2 to 20 methylene groups, and examples thereof include $C_{2-20}$ (preferably $C_4$-$C_{18}$) alkylene groups, etc. Examples of $C_{2-20}$ alkylene groups include ethylene, butylene, hexylene, dodecylene, octadecylene, etc.

There is no limitation to the bivalent linking group of $R^8$ with a length equivalent to 5 to 19 methylene groups, and examples thereof include $C_{5-19}$ (preferably $C_5$-$C_{15}$) alkylene groups, etc. Examples of $C_{5-19}$ alkylene groups include pentylene group, heptylene group, undecylen group, heptadecylene group, etc.

There is no limitation to a peptide residue bound to the monosaccharide or oligosaccharide residue, which is bound to a side chain of a water-soluble polymer through a linker having a selectively cleavable bond; however, a peptide residue composed of 2 to 30 amino acid residues bound to a monosaccharide or an oligosaccharide residue is preferable, and a peptide residue composed of 4 to 20 amino acid residues bound to a monosaccharide or an oligosaccharide residue is particularly preferable. There is no limitation to the constituent amino acid residues as long as they have an amino group and a carboxyl group in the molecule. Examples thereof include Gly (glycine), Ala (alanine), Val (valine), Leu (leucine), Ile (isoleucine), Tyr (tyrosine), Phe (phenylalanine), Trp (tryptophan), Glu (glutamic acid), Asp (aspartic acid), Lys (lysine), Arg (arginine), His (hystidine), Cys (cystein), Met (methionine), Ser (serine), Thr (threonine), Asn (asparagine), Gln (glutamine), Pro (proline) and like α-amino acid residues, and β-Ala and like β-amino acid residues, etc. Such amino acid residues may be D-amino acid or L-amino acid residues; however, L-amino acid residues are preferable.

There is no limitation to the monosaccharide residue or oligosaccharide residue bound, and examples thereof include galactose residue, mannose residue, N-acetylglucosamine residue, N-acetylgalactosamine residue, glucose residue, xylose residue, sialic acid residue, N-acetyllactosamine residue, lactose residue, chitobiose residue, α-2,3-sialyllactosamine residue, 3-β-galactosyl-(6-β-N-acetylglucosaminyl)-N-acetylgalactosamine residue, etc. Such monosaccharide residues or oligosaccharide residues may be bound by either α-linkages or β-linkages. Here, sialic acid is a general term for acyl derivatives of neuraminic acid, and includes N-acetylneuramic acid, N-glycolylneuraminic acid, 9-O-acetyl-N-acetylneuramic acid, etc.

Examples of linkers preferably used in the present invention include groups represented by General Formula (IV)

  (IV)

wherein $R^9$ is a bivalent linking group with a length equivalent to 1 to 20 methylene groups, and $R^{10}$ is an amino acid residue or a peptide residue having a site cleavable by a specific protease.

Examples of amino acid residues and peptide residues to which a monosaccharide residue or an oligosaccharide is bound include residues containing at least one amino acid selected from the group consisting of Ser, Thr, Glu, Gln, Asp, Asn, Lys, Cys, and Tyr; and a side chain functional group of such an amino acid can be bound to a sugar residue directly or via a bivalent linking group.

There is no limitation to the bivalent linking group of $R^9$ with a length equivalent to 1 to 20 methylene groups, and examples thereof include groups represented by General Formula (V)

  (V)

wherein A is O, $CH_2$, C=O or NH, the group is linked to a side chain of a water-soluble polymer through A, and n is an integer from 1 to 18. Specific examples thereof are as follows:

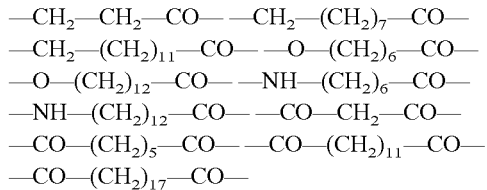

There is no limitation to the amino acid or peptide residue of $R^{10}$ having a cleavable site by an appropriate protease as long the amino acid or peptide residue comprises a site that can be cleaved by a protease that does not contain a cleavage site in an amino acid or a peptide residue to which a monosaccharide or an oligosaccharide residue is bound. For example, when the appropriate protease is α-chymotrypsin, $R^{10}$ may be phenylalanine, tryptophan, tyrosine or a like aromatic amino acid residue, when the appropriate protease is proline-specific protease, $R^{10}$ may be a proline residue, when the appropriate protease is lysine-specific protease, $R^{10}$ may be a lysine residue, when the appropriate protease is glutamic acid-specific protease, $R^{10}$ may be a glutamic acid residue, when the appropriate protease is trypsin, $R^{10}$ may be arginine, lysine or a like basic amino acid residue, when the appropriate protease is Factor Xa, $R^{10}$ may be an Ile (isoleucine)-Glu (glutamic acid) or Asp (aspartic acid)-Gly (glycine)-Arg (arginine) residue, and when the appropriate protease is enterokinase, $R^{10}$ may be an Asp(aspartic acid)-Asp(aspartic acid)-Asp(aspartic acid)-Asp(aspartic acid)-Lys(lysine) residue, etc. $R^{10}$ maybe suitably selected depending on the type of the amino acid or peptide residue to which a monosaccharide or an oligosaccharide residue is bound.

There is no limitation to the amino acid residue having a monosaccharide or an oligosaccharide residue bound to a side chain functional group through a bivalent linking group via a glycosidic bound, as long as the amino residue comprises a side chain functional group that can bond a monosaccharide or an oligosaccharide residue through a bivalent linking group via a glycosidic linkage; however, Ser, Thr, Lys, Asp, Glu, Tyr, Cys, Asn and Gln residues are preferable.

There is no limitation to the bivalent linking group as long as it can link an amino acid residue to a monosaccharide residue, but a bivalent linking group with a length equivalent to 1 to 20 methylene groups is preferable, and especially preferable is a group represented by General Formula (VI)

  (VI)

wherein B is O, NH, or C=O, the group is linked to a side chain functional group of an amino acid residue through B, and n is an integer from 1 to 18. Specific examples thereof are as follows:

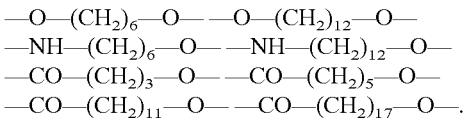

In one preferable embodiment, the sugar chain-having polymer of the present invention comprises a side chain functional group and is a copolymer of three or more types of monomers obtained by copolymerization (i) a polymerizable vinyl monomer to which a monosaccharide or an oligosaccharide residue, or an amino acid or peptide residue bonded to a monosaccharide or an oligosaccharide residue is bound to a side chain functional group of the polymer through a linker comprising a selectively cleavable bond, (ii) (meth)acrylic acid, and (iii) at least one of other type of vinyl monomer. The proportion of (meth)acrylic acid in total vinyl-based copolymer is 20 to 80 mol %, and preferably 40 to 60 mol %. Furthermore, the proportion of the polymerizable vinyl monomers that have a side chain functional group to which a monosaccharide or an oligosaccharide residue, or an amino acid or peptide residue bound to a monosaccharide or an oligosaccharide residue is linked through a linker comprising a selectively cleavable bond in the total monomer is not limited, but is preferably 0.1 to 50 mol % and more preferably 1 to 25 mol %.

Examples of polymerizable vinyl monomers having a side chain functional group to which a monosaccharide residue, an oligosaccharide residue, or an amino acid or a peptide residue bound with a monosaccharide or an oligosaccharide residue is linked through a linker comprising a selectively cleavable bond include acrylamide derivatives represented by General Formula (VII) wherein $R^{11}$ is a monosaccharide or an oligosaccharide residue, $R^{12}$ is a bivalent linking group with a length equivalent to 4 to 20 methylene groups; acrylamide derivatives represented by General Formula (IX) wherein $R^{17}$ is a linear or branched $C_{6-20}$ alkyl or alkenyl group, and n is an integer from 5 to 19; acrylamide derivatives represented by General Formula (X) wherein $R^{18}$ is a $C_{2-20}$ alkylene group, and $R^{19}$ is a $C_{5-19}$ alkylene group; and acrylamide derivatives represented by General Formula (XI) wherein $R^{20}$ is a $C_{1-18}$ alkylene group, $R^{21}$ is an amino acid or a peptide residue having a cleavable site by a appropriate protease, and $R^{22}$ is a Ser, Thr, Glu, Gln, Asp, Asn, Lys, Cys, or Tyr residue to which a monosaccharide or an oligosaccharide residue is bound directly or through a bivalent linking group via a glycosidic bond or is a peptide residue containing such an amino acid residue.

Examples of methacrylic esters include methyl methacrylate, ethyl methacrylate, hydroxyethyl methacrylate, dimethylaminoethyl methacrylate, etc.

Examples of styrene derivatives include styrene, p-hydroxystyrene, etc.

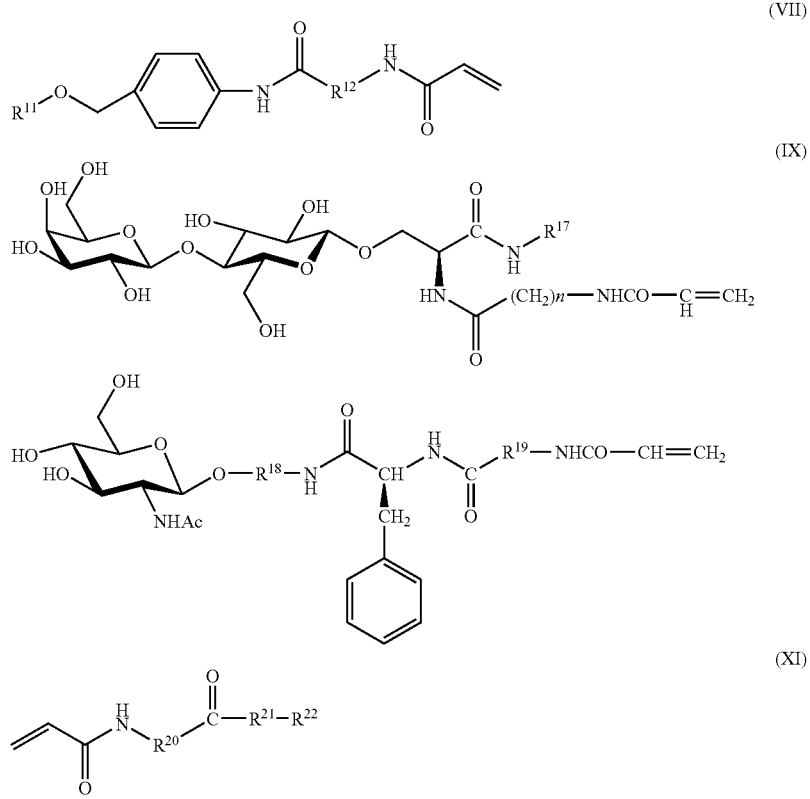

Note that instead of the acrylamide derivatives represented by General Formulae (VII), (IX), (X), and (XI), it is also possible to use the corresponding methacrylamide derivatives. The corresponding methacrylamide derivative can be produced by using the same materials and employing the same methods for producing acrylamide derivatives as described below except for using methacrylamide instead of acrylamide.

The copolymerization can be conducted using techniques such as radical polymerization, cationic polymerization, anionic polymerization, etc. Among such techniques, radical polymerization using ammonium peroxodisulfate, etc., as a catalyst is preferably employed.

Examples of vinyl monomers include acrylamide derivatives, methacrylamide derivatives, methacrylic acid, acrylic esters, methacrylic esters, styrene derivatives, fatty acid vinyl esters, etc.

Examples of acrylamide derivatives include acrylamide, and N-methylacrylamide, N-ethylacrylamide, N-isopropylacrylamide and like N-alkylacrylamides.

Examples of methacrylamide derivatives include methacrylamide, and N-methylmethacrylamide, N-isopropylmethacrylamide and the like N-alkylmethacrylamides, etc.

Examples of acrylic esters include methyl acrylate, ethyl acrylate, hydroxyethyl acrylate, and dimethylaminoethyl acrylate.

Examples of fatty acid vinyl esters include vinyl acetate, vinyl butyrate, etc.

The molecular weight of such a copolymer is usually about 10000 to about 10000000, preferably 20000 to 5000000, and more preferably 50000 to 2000000.

The acrylamide derivatives represented by General Formula (VII), (IX), (X), and (XI) can be synthesized by various techniques commonly employed in synthetic organic chemistry.

The acrylamide derivative represented by General Formula (VII) can be obtained by condensing, in the presence of a suitable catalyst, p-nitrobenzyl alcohol with a sugar oxazoline derivative represented by General Formula (XII) (wherein $R^{23}$, $R^{24}$, and $R^{25}$ are each independently an acyl-type protecting group, ether-type protecting group or a monosaccharide or an oligosaccharide residue having a hydroxyl group protected with an acyl-type protecting group and/or an ether-type protecting group), a halogenated sugar represented by General Formula (XIII) (wherein $X^1$ is F, Cl, Br or $OC(NH)CCl_3$, $R^{26}$ is a group represented by $NHCOCH_3$ or $OR^{30}$, and $R^{27}$, $R^{28}$, $R^{29}$ and $R^{30}$ are each independently an acyl-type protecting group, an ether-type protecting group, or a monosaccharide or an oligosaccharide residue having a hydroxyl group protected with an acyl-type protecting group and/or ether-type protecting group), or a trichloroacetimidate derivative represented by General Formula (XIII); converting the nitro group into an amino group by reduction; and condensing the resultant with an acrylamide derivative represented by General Formula (XV) (wherein n is an integer from 4 to 20) obtained by condensing an ω-amino fatty acid represented by General Formula (XIV) (wherein n an integer from 4 to 20) with a acryloyl chloride in the presence of a suitable condensing agent.

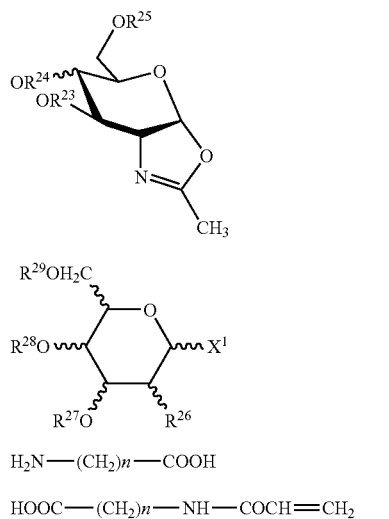

(XII)

(XIII)

H$_2$N—(CH$_2$)$n$—COOH (XIV)

HOOC—(CH$_2$)$n$—NH—COCH=CH$_2$ (XV)

The acrylamide derivative represented by General Formula (IX) can be obtained by, for example, condensing an activated lactose derivative represented by General Formula (XVI) (wherein $R^{31}$, $R^{32}$, $R^{33}$, $R^{34}$, $R^{35}$, $R^{36}$ and $R^{37}$ are each independently an acyl-type protecting group or an ether-type protecting group, and $X^2$ is F, Cl, Br, or OC(NH)CCl$_3$) and a serine derivative represented by General Formula (XVII) (wherein $R^{38}$ is a $C_{6-20}$ alkyl group or an alkenyl group, and $R^{39}$ is a protecting group) in the presence of suitable catalyst; removing the protecting group of the amino group in the serine residue; condensing with an acrylamide derivative represented by General Formula (XVIII) (wherein $Y^1$ is OH, Cl, or Br, and n is an integer from 5 to 9); and removing the protecting groups in lactose moiety.

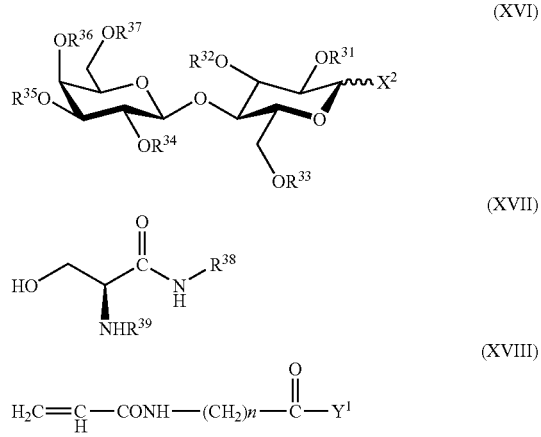

(XVI)

(XVII)

(XVIII)

The acrylamide derivative represented by General Formula (X) can be obtained by condensing, in the presence of a suitable catalyst, a sugar oxazoline derivative represented by General Formula (XIX) (wherein $R^{40}$, $R^{41}$, and $R^{42}$ each independently acyl-type protecting group or ether-type protecting group) with a phenylalanine derivative represented by General Formula (XX) (wherein $R^{43}$ is a $C_{2-20}$ alkylene group and $R^{44}$ is a protecting group), removing the protecting group, condensing with an acrylamide derivative represented by General Formula (XXI) (wherein $R^{45}$ is a $C_{5-19}$ alkylene group, and $Y^2$ is OH, Cl, or Br), and removing the protecting groups of the sugar portion.

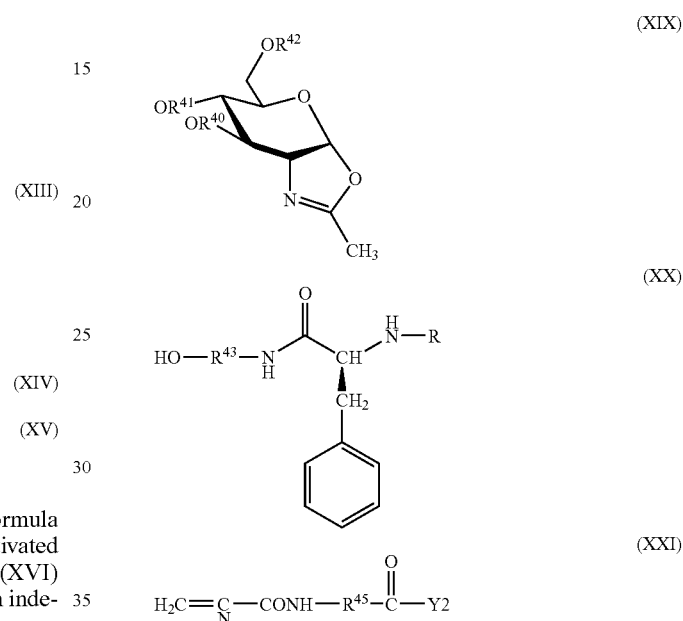

(XIX)

(XX)

(XXI)

The acrylamide derivative represented by General Formula (XI) can be synthesized using automated peptide synthesizer. Here below is explained when the protease used is α-chymotrypsin, $R^{21}$ is an aromatic amino acid residue, $R^{22}$ is an arbitrary peptide residue which does not contain an aromatic amino acid and which contains a serine residue, a threonine residue, a glutamine residue or an asparagines residue to which a monosaccharide residue is bound via a glycosidic bond formed between an OH group or an acid amide group and a monosaccharide residue, or a peptide residue contains an amino acid residue to which a monosaccharide residue is linked to a side chain functional group via a glycosidic bond through a bivalent linking group. First, peptide chain is elongated on a suitable solid-phase carrier to synthesize an arbitrary peptide that does not contain aromatic amino acid residue, but contains a serine residue, a threonine residue, a glutamine residue, or an asparagine residue to which a monosaccharide residue is bound via a glycosidic bond formed between an OH position or an acid amide group and a monosaccharide residue, or a peptide containing an amino acid residue to which an arbitrary monosaccharide residue is linked to a side chain functional group via a glycosidic bond through a bivalent linking group. Second, the peptide chain is elongated using an aromatic amino acid derivative in which an amino group is acylated by a group represented by General Formula (XXII) (wherein $R^{46}$ is a $C_{1-18}$ alkylene group), the elongated peptide is released from the solid-phase carrier, and a protecting groups in the peptide chain and monosaccharide residue are removed.

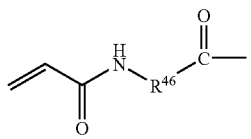
(XXII)

The peptide residue containing a serine residue, a threonine residue, a glutamine residue or an asparagine residue to which a monosaccharide residue is bound via a glycosidic bond formed between an OH position or an acid amide group and a monosaccharide residue, or the peptide residue containing an amino acid residue to which a monosaccharide residue is linked to a side chain functional group by a glycosidic bond through a bivalent linking group, can be introduced by using, instead of a standard N-protected amino acid, the corresponding N-protected amino acid to which a monosaccharide residue having hydroxyl groups protected with suitable protecting groups is bound to a side chain functional group via a glycosidic bond formed between an OH position or an acid amide group and a monosaccharide residue, or a bivalent linking group. An aromatic amino acid in which an amino group is acylated by a group represented by General Formula (XXII) can be also introduced by employing the same methods as for introducing typical N-protected amino acids.

Serine, threonine, glutamine and asparagine residues to which a monosaccharide residue having hydroxyl groups protected with suitable protecting groups is bound via a glycosidic bond formed between an OH position or acid amide and a monosaccharide residue, and N-protected amino acids to which a monosaccharide residue having hydroxyl groups protected with suitable protecting groups bonded to a side chain functional group through a bivalent linking group via a glycosidic linkage can be obtained by employing commonly used synthetic organic chemistry techniques. Furthermore, some N-protected amino acids to which a monosaccharide residue is bound, for example, Fmoc-Asn(GlcNAc(Ac)3-β-D)-OH, Fmoc-Ser(GalNAc(Ac)3-α-D)-OH, Fmoc-Thr(GalNAc(Ac)3-α-D)-OH, etc., are already commercially available and therefore it is possible to use these.

A polymerizable aromatic amino acid derivative in which an amino group is acylated by a group represented by General Formula (XXII) can be synthesized by employing commonly used synthetic organic chemistry techniques. For example, when the aromatic amino acid residue is a phenylalanine residue, the polymerizable phenylalanine derivative can be prepared by condensing a phenylalanine ethyl ester with an ω-acryloylamino fatty acid, and hydrolyzing the ethyl ester. Condensation of phenylalanine ethyl ester with an ω-acryloylamino fatty acid is not limited as long as phenylalanine ethyl ester and the ω-acryloylamino fatty acid can be condensed, and they can be condensed by contacting in the presence of a condensation agent typically used for peptide-bond formation, such as dicyclohexylcarbodiimide, carbodiimidazole, 1-ethoxycarbonyl-2-ethoxy-1,2-dihydroxyquinoline, diphenylphosphoryl azide, etc.

In the first step of producing the glycoconjugate of the present invention, a sugar residue is transferred from a sugar nucleotide to a sugar chain-having polymer by contacting the sugar chain-having water-soluble polymer compound with a glycosyltransferase in the presence of a sugar nucleotide.

Transfer of a sugar from a sugar nucleotide to a sugar chain-having polymer is usually performed by contacting them with a glycosyltransferase in a neutral buffer solution containing a sugar chain-having polymer and sugar nucleotides usually at 10 to 60° C. and preferably at 20 to 40° C., and usually for 1 to 120 hours and preferably for 2 to 72 hours.

The amount of sugar nucleotides used relative to one equivalent of sugar chain-having polymer is preferably from about one equivalent to excess.

Metal salts may be added to the reaction solution if needed. Examples of usable metal ions include magnesium, manganese, cobalt, nickel, copper, zinc, etc., and these are usually added in a form of chlorides, etc.

The glycosyltransferase used in the present invention is not limited as long as a sugar nucleotide can be used as a sugar donor. Leloir pathway glycosyltransferases are examples of such enzymes. Specific examples thereof include galactosyltransferases, N-acetylglucosaminyltransferase, N-acetylgalactosaminyltransferase, fucosyltransferase, sialyltransferase, mannosyltransferase, xylosyltransferase, glucuronyltransferase, etc. Such enzymes may be free or immobilized, although immobilized enzymes are preferable.

The sugar nucleotide used in the present invention is not limited as long as the above-mentioned enzyme can be used. Examples of such sugar nucleotides include uridine-5'-diphospho-galactose, uridine-5'-diphospho-N-acetylglucosamine, uridine-5'-diphospho-N-acetylgalactosamine, uridine-5'-diphospho-glucuronic-acid, uridine-5'-diphospho-xylose, guanosine-5'-diphospho-fucose, guanosine-5'-diphospho-mannose, cytidine-5'-monophoshpho-N-acetylneuramic acid, sodium salts thereof, etc.

In the second step of producing the glycoconjugate of the present invention, the sugar chain is elongated by transferring a plurality of sugar residues by repeating step two or more times according to requirements.

In the third step of producing the glycoconjugate of the present invention, by-product nucleotides or unreacted sugar nucleotides are removed if necessary. Methods for removing by-product nucleotides or unreacted sugar nucleotides are not limited as long as the sugar chain-having polymer can be separated from nucleotides and sugar nucleotides. Examples of such methods include gel filtration chromatography, ion-exchange chromatography, dialysis, ultrafiltration, etc.

In the fourth step of producing the glycoconjugate of the present invention, after repeating steps 1 to 3 several times, a glycoconjugate is released from the sugar chain-having polymer whose sugar chain has been elongated by transferred sugar residues. The method for release the glycoconjugate whose sugar chain has been elongated from the sugar chain-having polymer of the present invention is not limited as long as it can be released without decomposing the glycoconjugate whose sugar chain has been elongated. Examples of such methods include releasing under weak acid or weak alkali, by hydrogenolysis, by photoreaction, and by enzymatic reaction. Preferable example include hydrogenolysis, oxyzation using 2,3-dichloro-5,6-dicyanobenzoquinone, hydrolysis using a protease, transfer reaction using ceramide glycanase, etc.

BEST MODE FOR CARRYING OUT THE INVENTION

The following Examples are intended to illustrate the present invention in further detail, and not to limit the scope of the invention.

Reference Example 1

Synthesis of 2-methyl-(3,4,6-tri-O-acetyl-1,2-dideoxy-α-D-glucopyrano)-[2,1-d]-2-oxazoline To a solution of 2-acetamide-1,3,4,6-tetra-O-acetyl-2-deoxy-D-glucopyranoside (6.0 g) in 1,2-dichloroethane (40 ml) was added trimethylsilyl trifluoromethanesulfonic acid (3.2 ml). The mixture was stirred at 50° C. for 7 hours. After the reaction, the reaction mixture was cooled to room temperature, and triethylamine (10.8 ml) was added. After concentrating the reaction mixture under reduced pressure, the target compound was separated by silica gel column chromatography (eluant: toluene/ethyl acetate/triethylamine=100/200/1). The eluate was evaporated to give the target compound (5.0 g).

Reference Example 2

Synthesis of p-nitrobenzyl-2-acetamide-3,4,6-tri-O-acetyl-2-deoxy-D-glucopyranoside To a solution of 2-methyl-(3,4,6-tri-O-acetyl-1,2-dideoxy-α-D-glucopyrano)-[2,1-d]-2-oxazoline (2.8 g) obtained in Reference Example 1 in dichloroethane (40 ml) were added p-nitrobenzyl alcohol (10.4 g) and D-camphor-10-sulfonic acid (0.2 g). The mixture was stirred at 80° C. for 2 hours. After the reaction, the reaction mixture was cooled to room temperature, and triethylamine (4.0 ml) was added. After concentrating the reaction mixture under reduced pressure, the target compound was separated by silica gel column chromatography (eluant: chloroform/ethyl acetate/methanol=200/40/5). The eluate was evaporated to give the target compound (3.7 g).

Reference Example 3

Synthesis of 6-acryloylaminocaproic acid

To a solution of 6-Aminocaproic acid (10.0 g) in a 1.27 M aqueous sodium hydroxide solution (60 ml) was added a solution of acryloyl chloride (7.8 ml) in tetrahydrofuran (20 ml) dropwisely while chilling in ice water. During the addition, the reaction mixture was adjusted to be pH 8 to 9 by addition of 4 N aqueous sodium hydroxide solution. After the addition, the resulting mixture was stirred for 2 hours while being gradually cooled to room temperature. Subsequently, the reaction mixture was adjusted to be pH 3 by addition of 1 N hydrochloric acid and extracted with ethyl acetate. The organic layer was washed with distilled water and dried over anhydrous magnesium sulfate. The magnesium sulfate was filtered off, and the filtrate was concentrated under reduced pressure. The residue was dissolved in a small amount of ethyl acetate and recrystallized from hexane to give the target compound (9.6 g).

Reference Example 4

Synthesis of p-N-(6-acryloylaminohexanoyl)amino-benzyl-2-acetamide-3,4,6-tri-O-acetyl-2-deoxy-D-glucopyranoside To a solution of p-nitrobenzyl-2-acetamide-3,4,6-tri-O-acetyl-2-deoxy-D-glucopyranoside (1.6 g) obtained in Reference Example 2 in methanol (50 ml) were added ammonium formate (2.1 g) and 10% palladium-carbon (170 mg). After stirring at room temperature for 5 minutes, the catalyst was filtered off, and the filtrate was concentrated under reduced pressure. The residue was dissolved in chloroform. The mixture was washed with distilled water and dried over anhydrous sodium sulfate. After the drying, the sodium sulfate was filtered off, and the filtrate was concentrated under reduced pressure. To a solution of the residue in mixed solvent (44 ml) of dichloroethane:N,N-dimethylformamide=10:1 was added 0.6 g of the 6-acryloylaminocaproic acid obtained in Reference Example 3. Triethylamine (0.46 ml) and 1-(3-dimethylaminopropyl)-3-ethylcarbodiimide hydrochloride (65 mg) were then added with stirring at 0° C. The reaction mixture was cooled to room temperature with stirring, and stirred for 22 hours. Chloroform (60 ml) was added to the reaction mixture, and the resulting mixture was washed with 1 N aqueous sodium hydroxide solution, saturated aqueous sodium hydrogencarbonate solution and saturated saline solution in that order, and dried over anhydrous sodium sulfate. After filtering off the sodium sulfate and concentrating the filtrate under reduced pressure, the target compound was separated by silica gel column chromatography (eluant: chloroform/ethanol=30/1). The eluate was evaporated to give the target compound (1.1 g).

Example 1

Synthesis of p-N-(6-acryloylaminohexanoyl)amino-benzyl-2-acetamide-2-deoxy-D-glucopyranoside To a solution of p-N-(6-acryloylaminohexanoyl)amino-benzyl-2-acetamide-3,4,6-tri-O-acetyl-2-deoxy-D-glucopyranoside (660 mg) obtained in Reference Example 4 in methanol (70 ml) was added sodium methoxide (50 mg). The reaction mixture was stirred at room temperature for 15 hours. After the reaction, an $H^+$ cation exchange resin, Dowex 50WX-8 (Dow Chemical Co.), was added until pH 7. The ion exchange resin was filtered off, and the filtrate was evaporated to afford the target compound (520 mg).

Example 2

Synthesis of p-N-(6-acryloylaminohexanoyl)amino-benzyl-2-acetamide-2-deoxy-D-glucopyranoside/acrylic acid/acrylamide copolymer (Copolymerization Ratio=1:2:7, Sugar Chain-Having Polymer A)

A solution of the p-N-(6-acryloylaminohexanoyl)amino-benzyl-2-acetamide-2-deoxy-D-glucopyranoside (61.7 mg) obtained in Example 1, acrylic acid (18.0 mg) and acrylamide (62.2 mg) in mixed solvent (1 ml) of dimethyl sulfoxide: distilled water=3:1 was deaerated well by a water aspirator, to which were added N,N,N',N'-tetramethylethylenediamine (hereinafter referred to as TEMED) (11.6 µl) and ammonium peroxodisulfate (8.6 mg). The mixture was stirred at room temperature for 24 hours for copolymerization. After the reaction, the mixture was diluted with distilled water (2 ml), directly subjected to gel filtration chromatography on Sephadex G-50 (Amersham Pharmacia) column and eluted with 50 mM ammonium acetate. The void fractions were collected and lyophilized to afford the target compound (137 mg).

Example 3

Synthesis of p-N-(6-acryloylaminohexanoyl)amino-benzyl-2-acetamide-2-deoxy-D-glucopyranoside/acrylic acid/acrylamide copolymer (Copolymerization Ratio=1:4:5, Sugar Chain-Having Polymer B)

Copolymerization was performed in the same manner as in Example 2 except that acrylic acid and acrylamide were used in amounts of 36.0 mg and 44.4 mg, respectively, to afford 138 mg of the target compound.

Example 4

Synthesis of p-N-(6-acryloylaminohexanoyl)aminobenzyl-2-acetamide-2-deoxy-D-glucopyranoside/acrylic acid/acrylamide copolymer (Copolymerization Ratio=1:6:3, Sugar Chain-Having Polymer C)

Copolymerization was performed in the same manner as in Example 2 except that acrylic acid and acrylamide were used in amounts of 54.0 mg and 26.7 mg, respectively, to afford 139 mg of the target compound.

Example 5

Synthesis of p-N-(6-acryloylaminohexanoyl)aminobenzyl-2-acetamide-2-deoxy-D-glucopyranoside/acrylic acid/acrylamide copolymer (Copolymerization Ratio=1:8:1, Sugar Chain-Having Polymer D)

Copolymerization was performed in the same manner as in Example 2 except that acrylic acid and acrylamide were used in amounts of 72.1 mg and 8.9 mg, respectively, to afford 139 mg of the target compound.

Reference Example 5

Synthesis of p-N-(6-acryloylaminohexanoyl)aminobenzyl-2-acetamide-2-deoxy-D-glucopyranoside/acrylamide copolymer (Copolymerization Ratio=1:9, Sugar Chain-Having Polymer E)

Copolymerization was performed in the same manner as in Example 2 except that acrylic acid was not used and that acrylamide was used in an amount of 80.0 mg, to afford 138 mg of the target compound.

Reference Example 6

Synthesis of p-N-(6-acryloylaminohexanoyl)aminobenzyl-2-acetamide-2-deoxy-D-glucopyranoside/acrylic acid copolymer (Copolymerization Ratio=1:9, Sugar Chain-Having Polymer F)

Copolymerization was performed in the same manner as in Example 2 except that acrylamide was not used and that acrylic acid was used in an amount of 81.1 mg, to afford 139 mg of the target compound.

Example 6

Synthesis of p-N-(6-acryloylaminohexanoyl)aminobenzyl-2-acetamide-2-deoxy-D-glucopyranoside/acrylic acid/N-isopropylacrylamide copolymer (Copolymerization Ratio=1:2:7, Sugar Chain-Having Polymer G)

Copolymerization was performed in the same manner as in Example 2 except for using 99.0 mg of N-isopropylacrylamide in place of acrylamide, to afford 174 mg of the target compound.

Example 7

Synthesis of p-N-(6-acryloylaminohexanoyl)aminobenzyl-2-acetamide-2-deoxy-D-glucopyranoside/acrylic acid/N-isopropylacrylamide copolymer (Copolymerization Ratio=1:4:5, Sugar Chain-Having Polymer H)

Copolymerization was performed in the same manner as in Example 2 except that acrylic acid was used in an amount of 36.0 mg and that 70.7 mg of N-isopropylacrylamide was used in place of acrylamide, to afford 164 mg of the target compound.

Example 8

Synthesis of p-N-(6-acryloylaminohexanoyl)aminobenzyl-2-acetamide-2-deoxy-D-glucopyranoside/acrylic acid/N-isopropylacrylamide copolymer (Copolymerization Ratio=1:6:3, Sugar Chain-Having Polymer I)

Copolymerization was performed in the same manner as in Example 2 except that acrylic acid was used in an amount of 54.0 mg and that 42.4 mg of N-isopropylacrylamide was used in place of acrylamide, to afford 154 mg of the target compound.

Example 9

Synthesis of p-N-(6-acryloylaminohexanoyl)aminobenzyl-2-acetamide-2-deoxy-D-glucopyranoside/acrylic acid/N-isopropylacrylamide copolymer (Copolymerization Ratio=1:8:1, Sugar Chain-Having Polymer J)

Copolymerization was performed in the same manner as in Example 2 except that acrylic acid was used in an amount of 72.1 mg and that 14.1 mg of N-isopropylacrylamide was used in place of acrylamide, to afford 144 mg of the target compound.

Reference Example 7

Synthesis of p-N-(6-acryloylaminohexanoyl)aminobenzyl-2-acetamide-2-deoxy-D-glucopyranoside/N-isopropylacrylamide copolymer (Copolymerization Ratio=1:9, Sugar Chain-Having Polymer K)

Copolymerization was performed in the same manner as in Example 2 except that acrylic acid was not used and that N-isopropylacrylamide was used in an amount of 127.3 mg, to afford 183 mg of the target compound.

Reference Example 8

Synthesis of p-N-(6-acryloylaminohexanoyl)aminobenzyl-2-acetamide-2-deoxy-D-glucopyranoside/acrylamide/N-isopropylacrylamide copolymer (Copolymerization Ratio=1:5:4, Sugar Chain-Having Polymer L)

Copolymerization was performed in the same manner as in Example 2 except that acrylic acid was not used and that acrylamide and N-isopropylacrylamide were used in amounts of 44.4 mg and 56.6 mg, respectively, to afford 158 mg of the target compound.

Reference Example 9

Preparation of Immobilized
β1,4-galactosyltransferase 0.5 g of CNBr-activated Sepharose 4B (Pharmacia) was washed with three portions of 1 mM hydrochloric acid (total 100 ml). Five milliliters of 0.1 M boric acid buffer solution (pH 8.0) containing 10 U of β1,4-galactosyltransferase (Toyobo Co., Ltd.), 30 mg of bovine serum albumin (hereinafter BSA), 1 mM uridine-5'-diphosphogalactose (hereinafter UDP-Gal), 5 mM N-acetylglucosamine, 25 mM manganese chloride and 0.5 M NaCl was added, and incubated with gently shaking at 4° C. overnight. The immobilized β1,4-galactosyltransferase was collected by filtration with a glass filter, and washed with 5 ml of the same buffer solution as above except for containing no β1,4-galactosyltransferase. Five milliliters of 0.1 M Tris-HCl buffer solution (pH 8.0) was added to block remained active groups on the support. After washing with 1 M aqueous sodium chloride solution and then with distilled water, the immobilized β1,4-galactosyltransferase was immersed in 25 mM cacodylate buffer (pH 7.4) containing 1 mM UDP-Gal and 5 mM manganese chloride, and stored at 4° C. The obtained immobilized enzyme had an activity of 1.5 U/ml.

Example 10

Galactose Transfer to Sugar Chain-Having Polymers
by Immobilized β1,4-galactosyltransferase To 2.0 ml of 50 mM HEPES buffer solution (pH 7.5) containing 10 mM uridine-5'-diphosphogalactose, 10 mM manganese chloride and 0.26 mg/ml of α-lactoalbumin were added 1 ml of the immobilized β1,4-galactosyltransferase obtained in Reference Example 9 and 20 mg of one of sugar chain-having polymers A to L obtained in Examples 2 to 9 and Reference Examples 5 to 8, and the mixture was incubated with shaking at 37° C. for 24 hours. The reaction mixture was centrifuged, and the supernatant was subjected to Sephadex G-25 column chromatography (eluant: distilled water). The void fractions were then lyophilized to afford 19 mg of a product. To a solution of the product (1 mg) in 1 ml of mixed solvent of distilled water:ethanol=3:1 was added 1 mg of 10% palladium-carbon, and the nmixture was stirred under hydrogen atmosphere at room temperature for 24 hours. After filtering off the catalyst, the filtrate was further filtered with an ultrafiltration unit, Ultra Free MC (molecular weight cut-off: ca. 10,000, Millipore Corp.), to thereby collect the released oligosaccharide as a permeated fraction. The permeated fraction was lyophilized, and the residue was pyridylaminated by standard method and subjected to HPLC to analyze the proportions of N-acetyllactosamine and N-acetylglucosamine and thereby determine the sugar transfer yield. These results showed that the galactose transfer to each polymer proceeded quantitatively.

Reference Example 10

Preparation of Immobilized α2,3-sialyltransferase 0.5 g of NHS-activated Sepharose (Amersham Pharmacia) was washed with three portions of 1 mM hydrochloric acid (total 100 ml). Five milliliters of 50 mM HEPES buffer (pH 7.5) containing 1 U of pig liver α2,3-sialyltransferase, 30 mg of BSA and 1 mM cytidine-5'-diphosphate was added and incubated with gently shaking at 4° C. overnight. The immobilized α2,3-sialyltransferase was collected by filtration through a glass filter, and washed with 5 ml of the same buffer solution as above except for containing no α2,3-sialyltransferase. Five milliliters of 0.1 M Tris-HCl buffer (pH 8.0) was added to block remaining active groups on the support. After further washing, the α2,3-sialyltransferase was immersed in 25 mM cacodylate buffer (pH 7.4) containing 1 mM cytidine-5'-monophospho-N-acetylneuraminic acid (hereinafter CMP-NeuAc), and stored at 4° C. The obtained immobilized enzyme had an activity of 110 mU/ml.

Example 11

Sialic Acid Transfer to Sugar Chain-Having
Polymers by Immobilized α2,3-sialyltransferase To 0.5 ml of 50 mM HEPES buffer (pH 7.0) containing 0.05 ml of the immobilized α2,3-sialyltransferase obtained in Reference Example 10, 50 mM CMP-NeuAc, 10 mM manganese chloride and 0.1% of Triton CF-54 was added one of galactosylated sugar chain-having polymers A to L obtained in Example 10 in an amount of 6.5 mg (sugar chain-having polymer A to F), 8.0 mg, 7.5 mg, 7.1 mg, 6.7 mg, 8.4 mg or 7.3 mg, respectively, (corresponding to 5 μmol of N-acetyllactosamine residues), and the mixture was incubated with shaking at 30° C. for 24 hours. After the incubation, the reaction mixture was centrifuged, and a product was separated from the supernatant in the same manner as in Example 10. Thus, 6.0 mg (sugar chain-having polymers A to F), 7.5 mg, 7.0 mg, 6.5 mg, 6.2 mg, 7.8 mg or 6.8 mg of the product was obtained, respectively. One milligram of the product was weighed out, and the sugar transfer yield was determined in the same manner as in Example 10.

TABLE 1

Results of sugar transfer reactions by
immobilized α2,3-sialyltransferase

| Sugar chain- | Vinyl monomer contents | | | | |
|---|---|---|---|---|---|
| having polymer | GM | AA | AAm | NIPAM | Yield |
| A | 10 | 20 | 70 | 0 | 69% |
| B | 10 | 40 | 50 | 0 | 74% |
| C | 10 | 60 | 30 | 0 | 70% |
| D | 10 | 80 | 10 | 0 | 64% |
| E | 10 | 0 | 90 | 0 | 15% |
| F | 10 | 90 | 0 | 0 | 52% |
| G | 10 | 20 | 0 | 70 | 73% |
| H | 10 | 40 | 0 | 50 | 76% |
| I | 10 | 60 | 0 | 30 | 86% |
| J | 10 | 80 | 0 | 10 | 71% |
| K | 10 | 0 | 0 | 90 | 40% |
| L | 10 | 0 | 50 | 40 | 29% |

GM: p-N-(6-acryloylaminohexanoyl)amino-benzyl-2-acetamide-2-deoxy-D-glucopyranoside
AA: Acrylic acid
Aam: Acrylamide
NIPAM: N-isopropylacrylamide Reference Example 11

Synthesis of p-nitrobenzyl-4-(2',3',4,6'-tetra-O-acetyl-D-galactopyranosyl)-2,3,6-tri-O-acetyl-D-glucopyranoside To a solution of 1-bromo-4-(2',3',4',6'-tetra-O-acetyl-D-galactopyranosyl)-2,3,6-tri-O-acetyl-D-glucopyranoside (5.0 g) in dichloroethane (50 ml) were added p-nitrobenzyl alcohol (23.5 g) and molecular sieves 4 Å (5.0 g). Silver triflate (2.9 g) was added under a stream of nitrogen with stirring at 0° C. After addition, the reaction mixture was gradually allowed to room temperature, and stirred for 12 hours. The reaction mixture was diluted with chloroform and filtered with celite. The filtrate was washed with saturated saline solution, and the organic layer was dried over anhydrous magnesium sulfate. The magnesium sulfate was filtered off, and the filtrate was concentrated under reduced pressure and subjected to silica gel chromatography (eluant: chloroform/methanol=50/1). The eluate was evaporated to give the target compound (5.6 g).

Reference Example 12

Synthesis of p-N-(6-acryloylaminohexanoyl)-benzyl-4-(2',3',4',6'-tetra-O-acetyl-D-galactopyranosyl)-2,3,6-tri-O-acetyl-D-glucopyranoside To a solution of the p-nitrobenzyl-4-(2',3',4',6'-tetra-O-acetyl-D-galactopyranosyl)-2,3,6-tri-O-acetyl-D-glucopyranoside (3.0 g) obtained in Reference Example 11 in methanol (50 ml) were added ammonium formate (1.8 g) and 10% palladium-carbon (200 mg). After stirring at room temperature for 5 minutes, the catalyst was filtered off, and the filtrate was concentrated under reduced pressure. The residue was dissolved in chloroform. The mixture was washed with distilled water and dried over anhydrous magnesium sulfate. After the drying, the magnesium sulfate was filtered off, and the filtrate was concentrated under reduced pressure. To a solution of the residue in mixed solvent of dichloroethane:N,N,-dimethylformamide=10:1 (40 ml) was added 6-acryloylaminocaproic acid (0.85 g) obtained in Reference Example 3. Subsequently, triethylamine (634 µl) and 1-(3-dimethylaminopropyl)-3-ethylcarbodiimide hydrochloride (870 mg) were added with stirring and chilling in ice water, and the reaction mixture was allowed to room temperature with stirring. After stirring for 22 hours the reaction mixture was diluted with chloroform, and washed sequentially with 1 N sulfuric acid, saturated aqueous sodium bicarbonate solution and saturated saline solution. The organic layer was dried over anhydrous magnesium sulfate, the magnesium sulfate was filtered off, and the filtrate was concentrated under reduced pressure and subjected to silica gel chromatography (eluant: chloroform/ethanol=20/1). The eluate was evaporated to give the target compound (1.1 g).

Example 12

Synthesis of p-N-(6-acryloylaminohexanoyl)-benzyl-4-D-galactopyranosyl-D-glucopyranoside A solution of the p-N-(6-acryloylaminohexanoyl)-benzyl-2,3,4,6-tetra-O-acetyl-D-galactopyranosyl-2,3,6-tri-O-acetyl-D-glucopyranoside (1.0 g) obtained in Reference Example 12 in methanol (10 mL) was added sodium methoxide (24 mg). The reaction mixture was stirred at room temperature for 15 hours. After the reaction, the reaction mixture was neutralized with an ion exchange resin, Dowex 50W-X8 ($H^+$). The resin was filtered off, and the filtrate was evaporated to afford the target compound (650 mg).

Example 13

Synthesis of p-N-(6-acryloylaminohexanoyl)-benzyl-D-galactopyranosyl-D-glucopyranoside/acrylic acid/acrylamide copolymer (Copolymerization Ratio=1:4:5, Sugar Chain-Having Polymer M)

Using 76.8 mg of the p-N-(6-acryloylaminohexanoyl)-benzyl-D-galactopyranosyl-D-glucopyranoside obtained in Example 12, 36.0 mg of acrylic acid and 44.4 mg of acrylamide, copolymerization was performed by following the procedure of Example 2 to afford 151 mg of the target compound.

Example 14

Sialic Acid Transfer to Sugar Chain-Having Polymer M Using Immobilized α2,3-sialyltransferase 6.3 mg of sugar chain-having polymer M obtained in Example 13 (corresponding to 5 µmol of lactose residues) was incubated in 50 mM HEPES buffer (1.0 ml, pH 7.0) containing 0.3 ml of the immobilized α2,3-sialyltransferase obtained in Reference Example 10, 50 mM CMP-NeuAc, 10 mM manganese chloride, and 0.1% of Triton CF-54 with shaking at 30° C. for 24 hours. After the incubation, the reaction mixture was centrifuged, and a product was separated from supernatant in the same manner as in Example 10 to thereby afford 5 mg of the product. One milligram of the product was weighed out, and the yield of the sialic acid transfer reaction was determined in the same manner as in Example 10 and found to be 88%.

Reference Example 13

Synthesis of N-(6-acryloylaminocaproyl)phenylalanine ethyl ester

To a solution of phenylalanine ethyl ester hydrochloride (1.15 g) and 6-acryloylaminocaproic acid (1.11 g) obtained in Reference Example 3 in dimethylformamide (15 ml, hereinafter DMF) was added a solution of diphenylphosphoryl azide (1.65 g) in DMF (15 ml) with stirring while chilling in ice water, and a solution of triethylamine (1.11 g) in DMF (15 ml) was added dropwisely thereto. The reaction mixture was stirred while chilling in ice water for 4 hours, and then at room temperature for 24 hours. After the reaction, 450 ml of mixed solvent of benzene:ethyl acetate=1:1 was added, and the organic layer was washed with 5% hydrochloric acid, distilled water, saturated saline solution, saturated aqueous sodium hydrogencarbonate solution, distilled water and saturated saline solution in that order. The organic layer was dried over anhydrous sodium sulfate and then concentrated under reduced pressure, and the residue was recrystallized from benzene to give the target compound (1.35 g).

Reference Example 14

Synthesis of N-(6-acryloylaminocaproyl)phenylalanine 0.72 g of the N-(6-acryloylaminocaproyl)phenylalanine ethyl ester obtained in Reference Example 13 was added to 50 ml of methanol containing 1 N sodium hydroxide, followed by stirring at room temperature for 4 hours. After the reaction, an $H^+$ cation exchange resin, Dowex 50W (Dow Chemical Co.), was added for neutralization. The ion exchange resin was then filtered off, and the filtrate was evaporated to afford the target compound (0.65 g).

Reference Example 15

4-Pentenyl-3',4',6'-tri-O-acetyl-N-acetylglucosamine

To a solution of the 2-methyl-(3,4,6-tri-O-acetyl-1,2-dideoxy-α-D-glucopyrano)-[2,1-d]-2-oxazoline (3.3 g) obtained in Reference Example 1 and 4-penten-1-ol (1.7 g) in 1,2-dichloroethane (40 ml) was added CSA to be pH 2-3. The reaction mixture was stirred at 70° C. for 30 minutes. The reaction mixture was cooled to room temperature, diluted with chloroform and washed twice with saturated aqueous sodium hydrogencarbonate solution. The organic layer was dried over anhydrous magnesium sulfate overnight. The magnesium sulfate was filtered off with celite, and the filtrate was concentrated under reduced pressure and subjected to silica gel chromatography (eluant: chloroform). The eluate was evaporated to give the target compound (2.5 g).

Reference Example 16

4-O-(3',4',6'-tri-O-acetyl-N-acetylglucosaminyl)butyric acid

To a solution of potassium permanganate (1.95 g) in 17% aqueous acetic acid solution (35 ml) was added dropwisely with stirring under chilling in ice water a solution of 4-pentenyl-3',4',6'-tri-O-acetyl-N-acetylglucosamine (1.6 g) obtained in Reference Example 15 in glacial acetic acid (35 ml). The reaction mixture was stirred for 3 hours. After the reaction, ethyl acetate (300 ml) was added to the reaction mixture, and sodium sulfate (3.16 g) and 1 M hydrochloric acid (35 ml) were further added, and the resulting mixture was stirred while chilling in ice water. The organic layer was separated, washed with saturated saline solution and dried over anhydrous magnesium sulfate. After the drying, the magnesium sulfate was filtered off, and the filtrate was evaporated to afford the target compound (1.5 g).

Reference Example 17

Synthesis of N-α-(9-fluorenylmethyloxycarbonyl)-N-ε-(4-O—(3', 4',6'-tri-O-acetyl-N-acetylglucosaminyl)butanoyl)lysine To a solution of the 4-O-(3',4',6'-tri-O-acetyl-N-acetylglucosaminyl)butyric acid (0.43 g) obtained in Reference Example 16 in chloroform (20 ml) were added while chilling in icewater N-hydroxysuccinimide (0.12 g) and dicyclohexylcarbodiimide (0.21 g). The reaction mixture was stirred overnight. After the stirring, the reaction mixture was filtered, and the filtrate was concentrated under reduced pressure. The residue was dissolved in dimethoxymethane (10 ml), and a solution of N-α-(9-fluorenylmethyloxycarbonyl)lysine (0.37 g) in dimethoxymethane (10 ml) was added. The resulting mixture was stirred at room temperature for 1 hour. Water (100 ml) was poured. The precipitate was collected and washed with distilled water, 10% aqueous sodium hydrogencarbonate solution, 1 N hydrochloric acid and distilled water in that order. After evaporation, the residue was recrystallized from ethanol to give the target compound (0.56 g). N-α-(9-fluorenylmethyloxycarbonyl)-N-ε-(4-O-(3', 4', 6'-tri-O-acetyl-N-acetylglucosaminyl)butanoyl)lysine had the following structural formula, wherein Fmoc is a 9-fluorenylmethyloxycarbonyl group and Ac is an acetyl group.

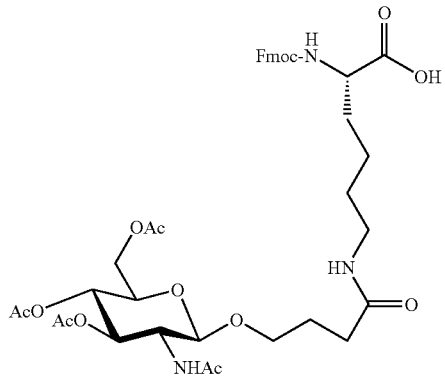

Reference Example 18

Synthesis of Acrylamide Derivative A

Using 0.44 g of 2-chlorotrityl resin preloaded with Fmoc-Ser(tBu) (0.23 mmol of Ser residues were attached per gram of the resin) as a sugar chain-having polymer, 1.0 mmol of each of the following N-protected amino acids were sequentially condensed by the Fmoc/DCC/HOBt method using a peptide synthesizer Model A433 (ABI) to synthesize the target acrylamide derivative on a solid phase support: Fmoc-Asp (OtBu)-OH, Fmoc-Gly-OH, Emoc-Arg(Pmc)-OH, Fmoc-Gly-OH, Fmoc-Asn(βAc₃GlcNAc)-OH, Fmoc-Gly-OH, N-(6-acryloylaminocaproyl)phenylalanine obtained in Reference Example 14. Deprotection of peptide residues was carried out at room temperature for 1 hour in dichloromethane containing 50% trifluoroacetic acid, 1% 1,2-ethanedithiol, 1% thioanisole and 5% phenol, and release the acrylamide derivative from the solid phase support. The resin was filtered off, and after concentration under reduced pressure, the residue was diluted with mixed solvent of ethyl acetate and chloroform (1:1). The organic layer was then washed with distilled water. HPLC (column: YMC-Pack ODS 20 mm×250 mm, eluant: A:B=100:0 (0 minutes)-50:50 (60 minutes), A: 0.1% aqueous trifluoroacetic acid solution, B: 0.1% trifluoroacetic acid acetonitrile solution, flow rate: 9.0 ml/min) was performed to purify the acrylamide derivative. The acrylamide derivative fraction was lyophilized, and 30 ml of methanol containing 2.2 mg of sodium methoxide was added to the residue, followed by stirring at room temperature for 2 hours. The resulting mixture was neutralized by adding an H⁺ cation exchange resin, Dowex 50W (Dow Chemical Co.), and the ion exchange resin was then filtered off, and the filtrate was evaporated to afford 96 mg of the target compound (acrylamide derivative A). Acrylamide derivative A had the following structural formula, wherein Ac is an acetyl group.

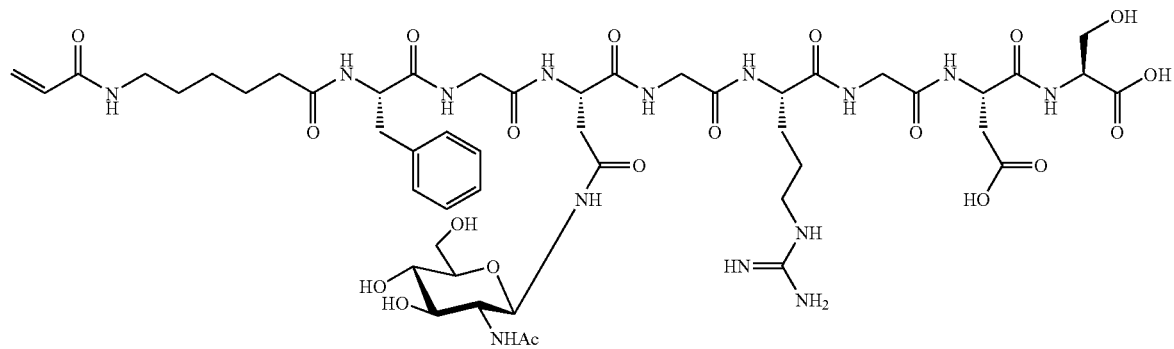

Reference Example 19

Synthesis of Acrylamide Derivative B

Following the procedure of Reference Example 18, 1.0 mmol of each of the following N-protected amino acids were sequentially condensed by the Fmoc/DCC/HOBt method to synthesize the target acrylamide derivative on a solid phase support: Fmoc-Asp (OtBu)-OH, Fmoc-Gly-OH, Fmoc-Arg (Pmc)-OH, Fmoc-Gly-OH, N-α-(9-fluorenylmethyloxycarbonyl)-N-ε-(4-O—(3',4', 6'-tri-O-acetyl-N-acetylglucosaminyl)butanoyl)lysine obtained in Reference Example 17, and N-(6-acryloylaminocaproyl)phenylalanine obtained in Reference Example 14. Following the procedure of Reference Example 18, the protective groups were removed from the peptide residues, and the target compound, an acrylamide derivative, was released from the solid phase support and purified to afford 97 mg of the target compound (acrylamide derivative B). Acrylamide derivative B had the following structural formula, wherein Ac is an acetyl group.

Example 15

Synthesis of Acrylamide Derivative A/Acrylic Acid/Acrylamide Copolymer (Copolymerization Ratio=1:4:6, Sugar Chain-Having Polymer N)

To a solution of acrylamide derivative A (60 mg) obtained in Reference Example 18 in 2 ml of dimethylsulfoxide (hereinafter DMSO) was added a solution of acrylic acid (14.4 mg) and acrylamide (21.3 mg) in water (1 ml). Subsequently, N,N,N',N'-tetramethylethylenediamine (7.5 μl) and ammonium peroxodisulfate (4.5 mg) were added, and copolymerization was carried out at 50° C. for 24 hours. The reaction mixture was concentrated under reduced pressure. After distilling off DMSO, the residue was subjected to column chromatography on Sephadex G-25 (Pharmacia) (eluant: 10 mM ammonium acetate). The void eluant was collected and lyophilized to afford 90 mg of the target compound (sugar chain-having polymer N). In the obtained polymer, the acrylamide derivative A residues to which a glycopeptide was bound had the following structural formula, wherein Ac is an acetyl group, and were contained in a proportion of about 9 mol %.

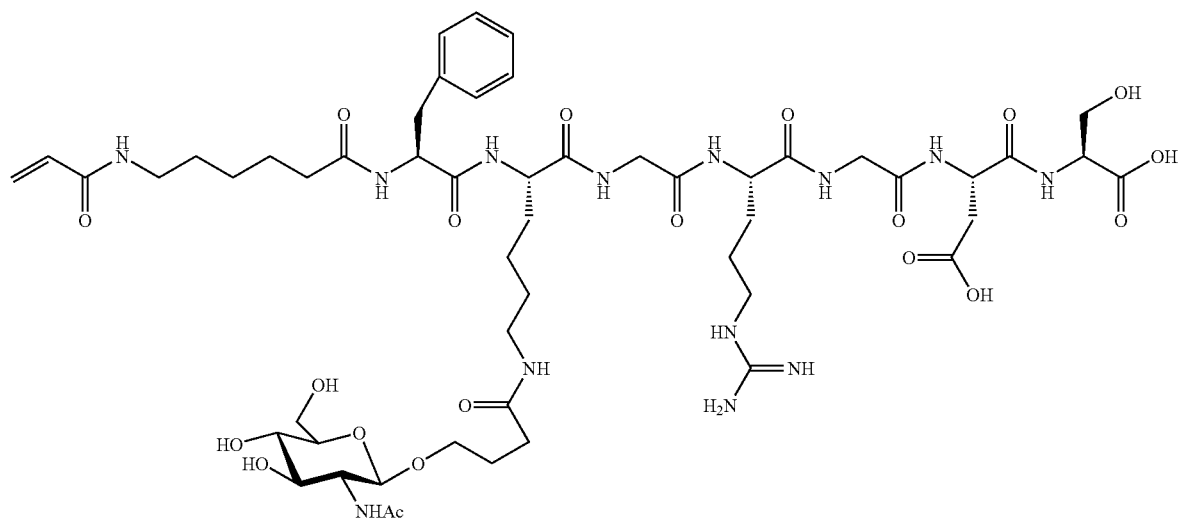

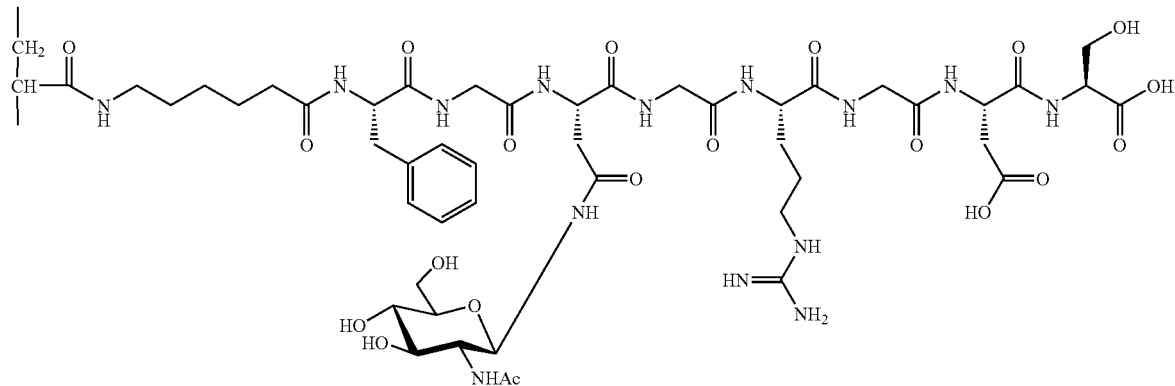

Example 16

Synthesis of Acrylamide Derivative B/Acrylic Acid/Acrylamide Copolymer (Copolymerization Ratio=1:4:6, Sugar Chain-Having Polymer O)

A reaction was carried out in the same manner as in Example 15 except for using 61 mg of acrylamide derivative B obtained in Reference Example 19 in place of 60 mg of acrylamide derivative A obtained in Reference Example 18, to afford 91 mg of the target compound (sugar chain-having polymer O). In the obtained polymer, the acrylamide derivative B residues to which a neoglycopeptide was bound had the following structural formula, wherein Ac is an acetyl group, and were contained in a proportion of 9 mol %.

Reference Example 20

Synthesis of Acrylamide Derivative A/Acrylamide Copolymer (Copolymerization Ratio=1:10, Sugar Chain-Having Polymer P)

A reaction was carried out in the same manner as in Example 15 except for using 35.5 mg of acrylamide in place of 14.4 mg of acrylic acid and 21.3 mg of acrylamide, to afford 90 mg of the target compound (sugar chain-having polymer P). In the obtained polymer, the acrylamide derivative A residues to which a glycopeptide was bonded were contained in a proportion of 9 mol %.

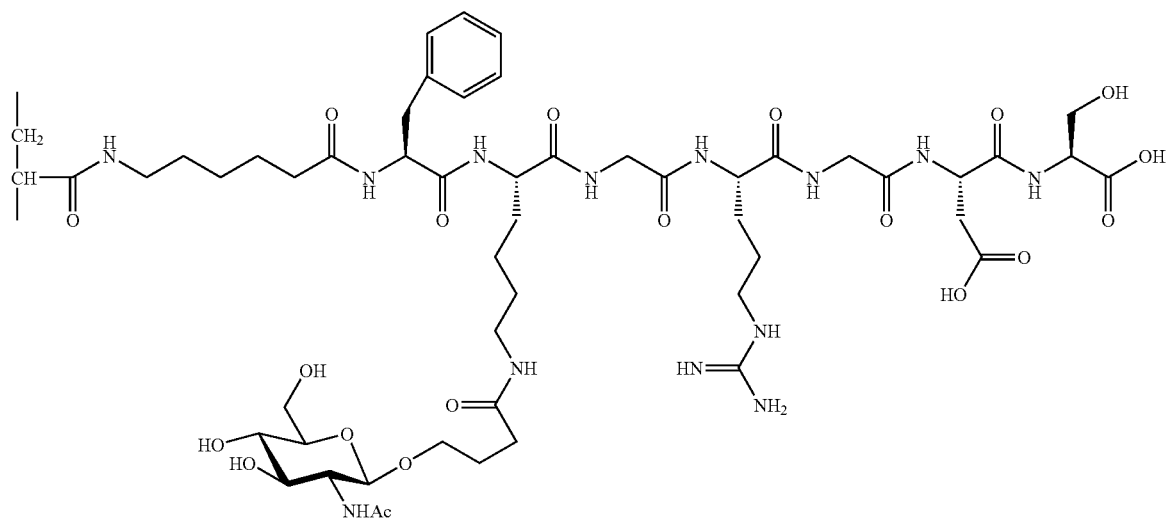

Reference Example 21

Synthesis of Acrylamide Derivative B/Acrylamide Copolymer (Copolymerization Ratio=1:10, Sugar Chain-Having Polymer Q)

A reaction was carried out in the same manner as in Example 15 except for using 35.5 mg of acrylamide in place of 14.4 mg of acrylic acid and 21.3 mg of acrylamide, and using 61 mg of acrylamide derivative B obtained in Reference Example 19 in place of 60 mg of acrylamide derivative A obtained in Reference Example 18, to afford 91 mg of the target compound (sugar chain-having polymer Q).

Example 17

Galactose Transfer to Sugar Chain-Having Polymer N by Immobilized β1,4-galactosyltransferase, and Release of Glycopeptide from Sugar Chain-Having Polymer N by α-chymotrypsin One milliliter of the immobilized β1,4-galactose transferase obtained in Reference Example 9 and 38 mg of sugar chain-having polymer N obtained in Example 15 were incubated in 2 ml of 50 mM HEPES buffer (pH 7.0) containing 50 mM UDP-Gal and 10 mM manganese chloride with shaking at 37° C. for 48 hours. After the incubation, the reaction mixture was subjected to column chromatography on Sephadex G-25 (Pharmacia) (eluant: 10 mM ammonium acetate). The void fraction, the fraction containing a product, was then lyophilized to afford 36 mg of a product. A solution of the product (10 mg) and 0.3 mg of α-chymotrypsin (0.3 mg) in 80 mM tris-hydrochloric acid buffer solution (2 ml, pH 7.8, containing 0.1 M calcium chloride) was incubated at 40° C. for 24 hours to release a glycopeptide whose sugar chain had been elongated, from the sugar chain-having polymer. The reaction mixture was subjected to column chromatography on Sephadex G-25 (Pharmacia) (eluant: 10 mM acetic ammonium). The fraction containing a product was lyophilized to afford 6 mg of a glycopeptide whose sugar chain had been elongated. The H-NMR spectrum of the obtained glycopeptide was measured, showing that the glycopeptide had the following structural formula, wherein Ac is an acetyl group, and that the galactose transfer reaction had proceeded quantitatively.

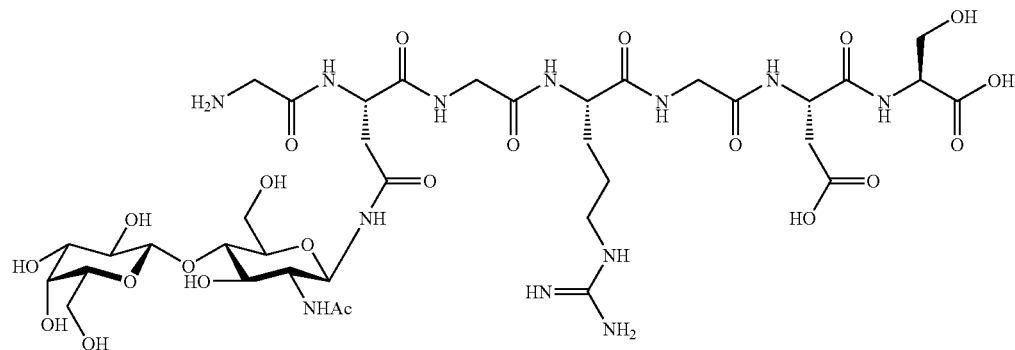

Example 18

Galactose Transfer to Sugar Chain-Having Polymer O by Immobilized β1,4-galactosyltransferase, and Release of Neoglycopeptide from Sugar Chain-Having Polymer O by α-chymotrypsin A reaction was carried out in the same manner as in Example 17 except for using 39 mg of sugar chain-having polymer O obtained in Example 16 in place of 38 mg of sugar chain-having polymer N obtained in Example 15, to afford 37 mg of a product. Using 10 mg of the product, the procedure of Example 17 was followed to release a neoglycopeptide whose sugar chain had been elongated, from the sugar chain-having polymer. The H-NMR spectrum of the obtained neoglycopeptide was measured, showing that the neoglycopeptide had the following structural formula, wherein Ac is an acetyl group, and that the galactose transfer reaction had proceeded quantitatively.

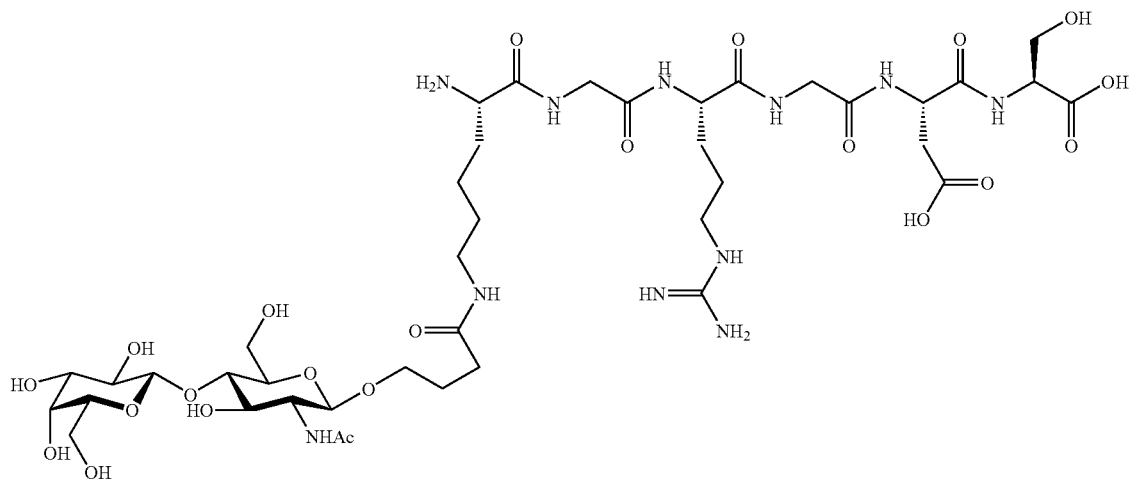

Reference Example 22

Galactose Transfer to Sugar Chain-Having Polymer P by Immobilized β1,4-galactosyltransferase A reaction was carried out in the same manner as in Example 17 except for using 38 mg of sugar chain-having polymer P obtained in Reference Example 20 in place of 38 mg of sugar chain-having polymer N obtained in Example 15, to afford 36 mg of a product. The H-NMR spectrum of the obtained product was measured, showing that the product contained transferred galactose. In the polymer containing transferred galactose, the acrylamide derivative A residues to which a glycopeptide was bound had the following structural formula, wherein Ac is an acetyl group.

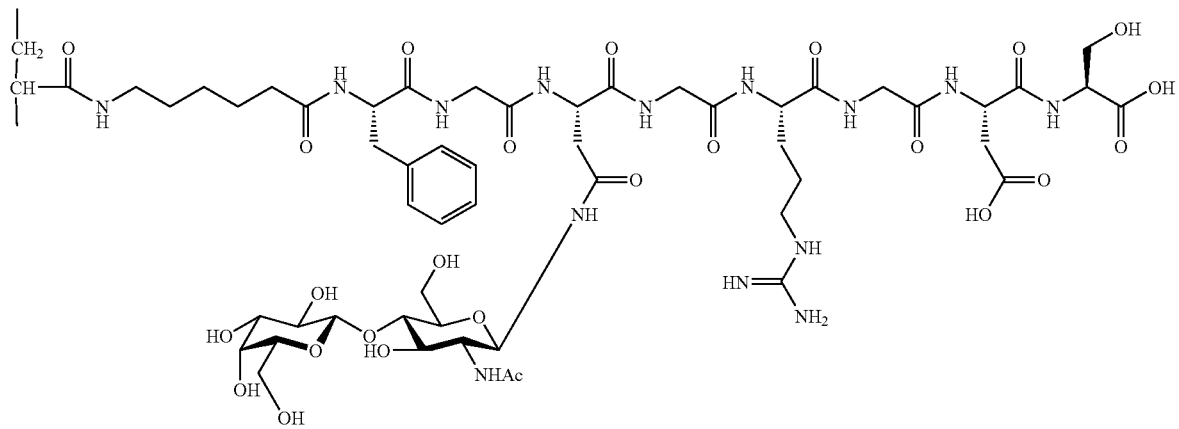

Reference Example 23

Galactose Transfer to Sugar Chain-Having Polymer Q by Immobilized β1,4-galactosyltransferase A reaction was carried out in the same manner as in Example 17 except for using 39 mg of sugar chain-having polymer Q obtained in Reference Example 21 in place of 38 mg of sugar chain-having polymer N obtained in Example 15, to afford 37 mg of a product. The H-NMR spectrum of the obtained product was measured, showing that the product contained transferred galactose. In the polymer containing transferred galactose, the acrylamide derivative B residues to which a glycopeptide was bound, had the following structural formula, wherein Ac is an acetyl group.

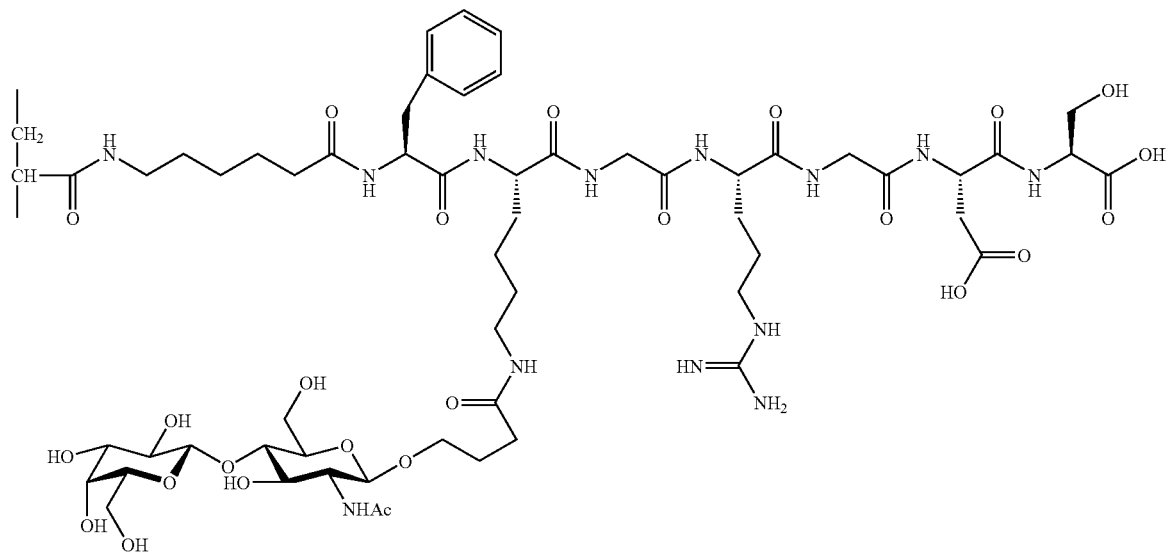

Example 19

Sialic Acid Transfer to Sugar Chain-Having Polymers N and P by Immobilized α2,3-sialyltransferase One milliliter of the immobilized α2,3-sialyltransferase obtained in Reference Example 10, and either 21 mg of sugar chain-having polymer N containing transferred galactose obtained in Example 17, or 21 mg of sugar chain-having polymer P containing transferred galactose obtained in Reference Example 22, were incubated in 2 ml of 50 mM sodium cacodylate buffer (pH 7.0) containing 50 mM CMP-NeuAc, 10 mM manganese chloride and 0.1% Triton CF-54 at 37° C. for 18 hours. After the incubation, the reaction mixture was subjected to column chromatography on Sephadex G-25 (Pharmacia) (eluant: 10 mM ammonium acetate). The fraction containing a product was lyophilized. 17 mg each of two products was thereby obtained. Using 10 mg each of the obtained products, the procedure of Example 17 was followed to release glycopeptides whose sugar chain had been elongated, from the sugar chain-having polymers. The H-NMR spectra of the released glycopeptides were measured, and based on the spectra, the conversions of the sialic acid transfer reactions were compared. The results were that the conversion of sugar chain-having polymer N was about 80%, whereas that of sugar chain-having polymer P was about 50%, demonstrating that sugar chain-having polymer N had superior reactivity.

Example 20

Sialic Acid Transfer to Sugar Chain-Having Polymers O and Q Using Immobilized α2,3-sialyltransferase A reaction was carried out in the same manner as in Example 19 except for using 22 mg of sugar chain-having polymer O containing transferred galactose obtained in Example 18, or 22 mg of sugar chain-having polymer Q containing transferred galactose obtained in Reference Example 23, in place of 21 mg of sugar chain-having polymer N containing transferred galactose obtained in Example 17, or 21 mg of sugar chain-having polymer P containing transferred galactose obtained in Reference Example 20, to afford 18 mg each of two products. Using 10 mg each of the obtained products, the procedure of Example 17 was followed to release neoglycopeptides whose sugar chain had been elongated, from the sugar chain-having polymers. The H-NMR spectra of the released neoglycopeptides were measured, and based on the spectra, the conversions of the sialic acid transfer reactions were compared. The results were that the conversion of sugar chain-having polymer O was about 80%, whereas that of sugar chain-having polymer Q was about 60%, demonstrating that sugar chain-having polymer O had superior reactivity.

Example 21

Sialic Acid Transfer to Sugar Chain-Having Polymer N by Immobilized α2,3-sialyltransferase, and Release of Glycopeptide from Sugar Chain-Having Polymer N by α-chymotrypsin A reaction was carried out in the same manner as in Example 19 except that the reaction was performed for 24 hours using 100 mM CMP-NeuAc and 1.5 ml of the immobilized α2,3-sialyltransferase obtained in Reference Example 10 in place of 50 mM CMP-NeuAc and 1.0 ml of the immobilized α2,3-sialyltransferase obtained in Reference Example 10, to afford 17 mg of a product. The procedure of Example 17 was followed to release a glycopeptide whose sugar chain had been elongated, from the sugar chain-having polymer, and the H-NMR spectrum of the obtained glycopeptide was measured, showing that the glycopeptide had the following structural formula, wherein Ac is an acetyl group, and that the sialic acid transfer reaction proceeded nearly quantitatively.

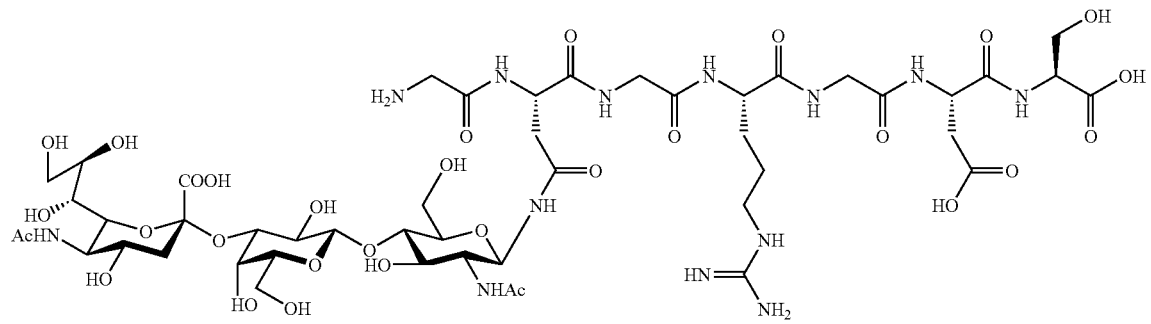

Reference Example 24

Synthesis of N-(benzyloxycarbonylphenylalanyl)-6-amino-1-hexanol

To a solution of N-benzyloxycarbonylphenylalanine (11.96 g) and 6-amino-1-hexanol (5.2 g) in a mixed solvent (40 ml) of benzene:ethanol=1:1 was added N-ethoxycarbonyl-2-ethoxy-1,2-dihydroquinoline (hereinafter EEDQ) (9.9 g), followed by stirring at room temperature for 24 hours. After the reaction, the reaction mixture was evaporated, and the residue was recrystallized from benzene to give the target compound (13.6 g). N-(benzyloxycarbonylphenylalanyl)-6-amino-1-hexanol had the following structural formula.

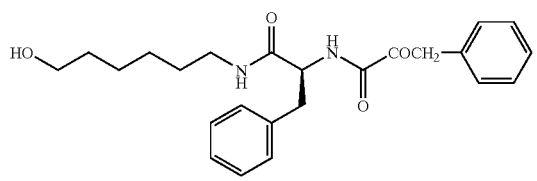

Reference Example 25

Synthesis of N-(benzyloxycarbonylphenylalanyl)-6-aminohexyl-2-acetamide-3,4,6-tri-O-acetyl-2-deoxy-β-D-glucopyranoside To a solution of the 2-methyl-(3,4,6-tri-O-acetyl-1,2-dideoxy-α-D-glucopyrano)-[2,1-d]-2-oxazoline (2.96 g) obtained in Reference Example 1 and the N-(benzyloxycarbonylphenylalanyl)-6-amino-1-hexanol (7.17 g) obtained in Reference Example 24 in dichloroethane (35 ml) was added D-camphor-10-sulfonic acid (hereinafter CSA) to be pH 2-3 at 70° C. After stirring for 30 minutes the reaction mixture was cooled to room temperature, diluted with chloroform and washed twice with saturated aqueous sodium hydrogencarbonate solution. The organic layer was dried over anhydrous magnesium sulfate overnight. The magnesium sulfate was filtered off through celite, and the filtrate was concentrated under reduced pressure and subjected to silica gel chromatography (eluant; chloroform). The eluate was evaporated to give the target compound (2.37 g). N-(benzyloxycarbonylphenylalanyl)-6-amino hexyl-2-acetamide-3,4,6-tri-O-acetyl-2-deoxy-β-D-glucopyranoside had the following structural formula, wherein Ac is an acetyl group.

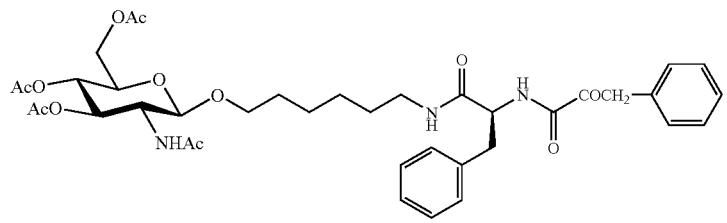

Reference Example 26

Synthesis of N-(6'-acryloylaminocaproyl)phenylalanyl-6-aminohexyl-2-acetamide-3,4,6-tri-O-acetyl-2-deoxy-β-D-glucopyranoside To a solution of the N-(benzyloxycarbonylphenylalanyl)-6-aminohexyl-2-acetamide-3,4,6-tri-O-acetyl-2-deoxy-β-D-glucopyranoside (1.5 g) obtained in Reference Example 25 in methanol (40 ml) was added 10% palladium-carbon (150 mg). The reaction mixture was stirred under hydrogen atmosphere at 50° C. for 2 hours. The catalyst was filtered off, and the filtrate was concentrated under reduced pressure. To a solution of the residue and the 6-acryloylaminocaproic acid (0.42 g) obtained in Reference Example 3 in mixed solvent of ethanol:benzene=1:1 was added EEDQ (0.55 g), followed by stirring at room temperature for 24 hours. The reaction mixture was concentrated under reduced pressure, and the residue was recrystallized from ethanol to give the target compound (1.2 g). N-(6'-acryloylaminocaproyl)phenylalanyl-6-aminohexyl-2-acetamide-3,4,6-tri-O-acetyl-2-deoxy-β-D-glucopyranoside had the following structural formula, wherein Ac is an acetyl group.

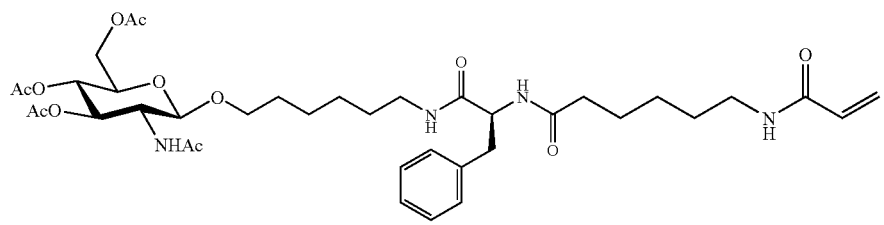

Reference Example 27

Synthesis of N-(6'-acryloylaminocaproyl)phenylalanyl-6-aminohexyl-2-acetamide-2-deoxy-β-D-glucopyranoside To a solution of the N-(6'-acryloylaminocaproyl)phenylalanyl-6-aminohexyl-2-acetamide-3,4,6-tri-O-acetyl-2-deoxy-β-D-glucopyranoside (590 mg) obtained in Reference Example 26 in mixed solvent of THF:methanol=1:1 (20 ml) was added sodium methoxide (16.9 mg), followed by stirring at room temperature for 24 hours. A cation exchange resin, Dowex 50WX-8 (H⁺) (Dow Chemical Co.), was added to be pH 7. The ion exchange resin was filtered off, and the filtrate was concentrated under reduced pressure. The residue was recrystallized from mixed solvent of ethanol:benzene=1:1 to give the target compound (413 mg). N-(6'-acryloylaminocaproyl)phenylalanyl-6-aminohexyl-2-acetamide-2-deoxy-β-D-glucopyranoside had the following structural formula, wherein Ac is an acetyl group.

Example 22

Synthesis of N-(6'-acryloylaminocaproyl)phenylalanyl-6-aminohexyl-2-acetamide-2-deoxy-β-D-glucopyranoside/acrylic acid/acrylamide copolymer (Copolymerization Ratio=1:2:7, Sugar Chain-Having Polymer R)

To a solution of the N-(6'-acryloylaminocaproyl)phenylalanyl-6-aminohexyl-2-acetamide-2-deoxy-β-D-glucopyranoside (79.3 mg) obtained in Reference Example 27, acrylic acid (18.0 mg) and acrylamide (62.2 mg) in mixed solvent of DMSO:water=3:1 (1 ml) were added TEMED (11.6 μl) and ammonium peroxodisulfate (8.6 mg), and copolymerization was carried out at room temperature for 24 hours. The reaction mixture was concentrated under reduced pressure, DMSO was distilled off, and the residue was subjected to column chromatography on Sephadex G-25 (Pharmacia) (eluant; 10 mM ammonium acetate). The target compound fraction was lyophilized to afford the target compound (160 mg). The N-(6'-acryloylaminocaproyl)phenylalanyl-6-aminohexyl-2-acetamide-2-deoxy-β-D-glucopyranoside residues in the obtained polymer had the following structural formula.

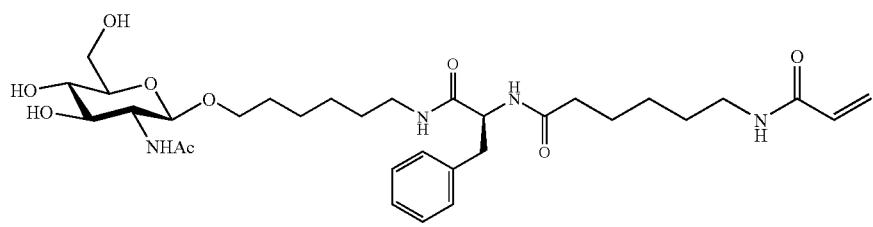

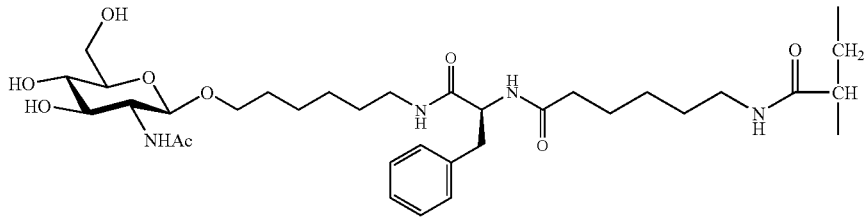

Reference Example 28

Synthesis of N-(6'-acryloylaminocaproyl)phenylalanyl-6-aminohexyl-2-acetamide-2-deoxy-β-D-glucopyranoside/acrylamide copolymer (Copolymerization Ratio=1:9, Sugar Chain-Having Polymer S)

A reaction was carried out in the same manner as in Example 22, except for using 80.0 mg of acrylamide in place of 18.0 mg of acrylic acid and 62.2 mg of acrylamide, to afford 160 mg of the target compound.

Example 23

Galactose Transfer to Sugar Chain-Having Polymer R by Immobilized β1,4-galactosyltransferase 0.5 ml of the immobilized β1,4-galactosyltransferase obtained in Reference Example 9 and 13.5 mg of sugar chain-having polymer R obtained in Example 22 were incubated with shaking in 50 mM HEPES buffer (1.0 ml, pH 7.0) containing 20 mM UDP-Gal and 10 mM manganese chloride at 37° C. for 24 hours. After the incubation, the immobilized β1,4-galactosyltransferase was removed by centrifugation, and the resulting reaction mixture was subjected to column chromatography on Sephadex G-25 (Pharmacia) (eluant: 50 mM ammonium formate). The fraction containing a product was lyophilized to afford a product (11 mg). The H-NMR spectrum of the obtained product was measured, showing that galactose had been quantitatively transferred.

Reference Example 29

Galactose Transfer to Sugar Chain-Having Polymer S by Immobilized β1,4-galactosyltransferase A reaction was carried out in the same manner as in Example 23 except for using 13.5 mg of sugar chain-having polymer S obtained in Example 28 in place of 13.5 mg of sugar chain-having polymer R obtained in Reference Example 22, to afford 11 mg of a product. The H-NMR spectrum of the obtained product was measured, showing that galactose had been quantitatively transferred.

Reference Example 30

Preparation of Immobilized β2,6-sialyltransferase

The procedure of Reference Example 10 was followed except for using 1 U of rat liver-derived α2,6-sialyltransferase in place of 1 U of α2,3-sialyltransferase, to prepare the target compound, which was then stored at 4° C. The obtained immobilized enzyme had an activity of 120 mU/ml.

Example 24

Sialic Acid Transfer to Sugar Chain-Having Polymers R and S by Immobilized α2,6-sialyltransferase 0.5 ml of the immobilized α2,6-sialyltransferase obtained in Reference Example 30, and either 7.5 mg of sugar chain-having polymer R containing transferred galactose obtained in Example 23, or 7.5 mg of sugar chain-having polymer S containing transferred galactose obtained in Reference Example 29, were incubated with shaking in 50 mM sodium cacodylate buffer (1 ml, pH 7.4) containing 25 mM CMP-NeuAc and 10 mM manganese chloride at 37° C. for 24 hours. The procedure of Example 23 was followed to afford 6 mg each of two products. The H-NMR spectra of the obtained products were measured and the conversions of the sialic acid transfer reactions were compared. The results were that the reaction proceeded quantitatively in sugar chain-having polymer R, whereas only 70% of the reaction proceeded in sugar chain-having polymer S.

Example 25

Release of Glycoconjugate from Sugar Chain-Having Polymer R by α-chymotrypsin

Five milligrams of sugar chain-having polymer R containing transferred sialic acid obtained in Example 24 and 0.6 mg of α-chymotrypsin were incubated in 80 mM tris-hydrochloric acid buffer (2 ml, pH 7.8, containing 0.1 M calcium chloride) at 40° C. for 24 hours. The reaction mixture was subjected to column chromatography on Sephadex G-25 (Pharmacia) (eluant: 50 mM ammonium formate). The fraction containing a product was lyophilized to afford a product (2 mg). The H-NMR spectrum of the obtained product was measured, showing that the product had the following structural formula.

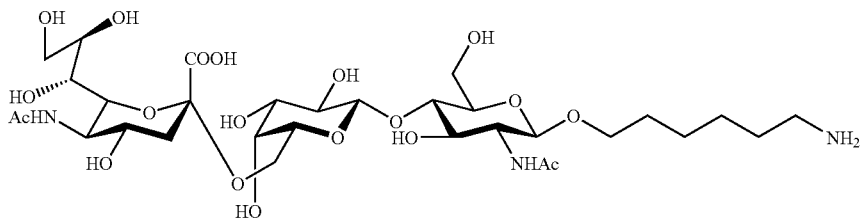

Reference Example 31

Synthesis of N-benzyloxycarbonylserine octylamide

To a solution of N-benzyloxycarbonylserine (12 g) in mixed solvent of ethanol:benzene=1:1 (120 ml) were added EEDQ (13.6 g) and octylamine (11.1 ml), followed by stirring at room temperature overnight. The reaction mixture was concentrated under reduced pressure and recrystallized from toluene to give the target compound (12.64 g). N-benzyloxycarbonylserine octylamide had the following structural formula.

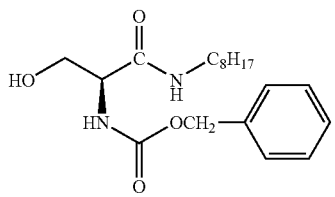

Reference Example 32

Synthesis of O-(2,3,6,2',3',4',6'-hepta-O-acetyl)lactosyl-N-benzyloxycarbonylserine octylamide To a solution of the N-benzyloxycarbonylserine octylamide (4.0 g) obtained in Reference Example 31 and dried thoroughly preliminary in dichloroethane (80 ml) were added activated molecular sieves 4 Å (8.0 g) and 2,3,6,2',3',4',6'-hepta-O-acetyllactosyl bromide (12.0 g). Silver trifluoromethanesulfonate (4.40 g) was added while chilling in ice water, and the resulting mixture was stirred overnight under a stream of nitrogen while gradually being allowed to room temperature. The reaction mixture was filtered through celite, and the filtrate was washed twice with saturated saline solution and then dried over anhydrous magnesium sulfate. After the drying, the magnesium sulfate was filtered off, and the filtrate was concentrated under reduced pressure and thereafter subjected to silica gel column chromatography (eluant: toluene/ethyl acetate=5/1). The eluate was evaporated to give the target compound (5.32 g). O-(2,3,6,2',3',4',6'-hepta-O-acetyl)lactosyl-N-benzyloxycarbonylserine octylamide had the following structural formula, wherein Ac is an acetyl group.

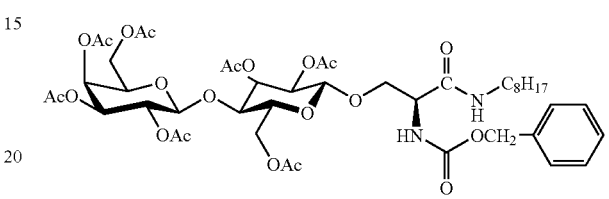

Reference Example 33

Synthesis of O-(2,3,6,2',3',4',6'-hepta-O-acetyl)lactosylserine octylamide 4.0 g of the O-(2,3,6,2',3',4',6'-hepta-O-acetyl)lactosyl-N-benzyloxycarbonylserine octylamide obtained in Reference Example 32 was dissolved in methanol (60 ml), and catalytic reduction was carried out under hydrogen atmosphere at room temperature in the presence of 5% palladium-carbon as catalyst. After the reaction, the catalyst was filtered off, and the reaction mixture was evaporated to afford the target compound (3.42 g). O-(2,3,6,2',3',4',6'-hepta-O-acetyl)lactosylserine octylamide had the following structural formula, wherein Ac is an acetyl group.

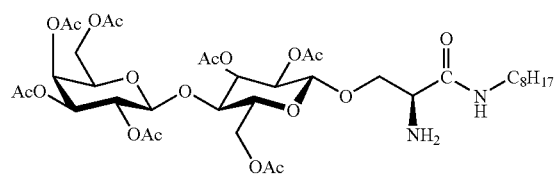

Reference Example 34

Synthesis of O-(2,3,6,2',3',4',6'-hepta-O-acetyl)lactosyl-N-(6-acryloylamino)caproylserine octylamide To a solution of the 6-acryloylaminocaproic acid (278 mg) obtained in Reference Example 3 and EEDQ (371 mg) in mixed solvent of ethanol:benzene=1:1 (40 ml) was added O-(2,3,6,2',3',4',6'-hepta-O-acetyl)lactosylserine octylamide (1.14 g) obtained in Reference Example 33, followed by stirring at room temperature overnight. The reaction mixture was concentrated under reduced pressure and subjected to silica gel chromatography (eluant: chloroform/methanol=100/1). The fraction containing the target compound was evaporated to give the target compound (1.06 g). O-(2,3,6,2',3',4',6'-hepta-O-acetyl)lactosyl-N-(6-acryloylamino)caproylserine octylamide had the following structural formula, wherein Ac is an acetyl group.

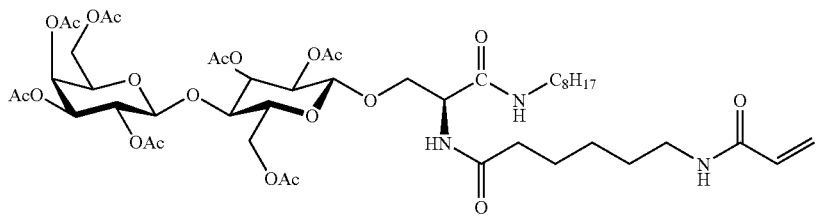

Reference Example 35

Synthesis of O-lactosyl-N-(6-acryloylamino)caproylserine octylamide

Four hundred milligrams of O-(2,3,6,2',3',4',6'-hepta-O-acetyl)lactosyl-N-(6-acryloylamino)caproylserine octylamide obtained in Reference Example 34 was dissolved in an appropriate amount of mixed solvent of tetrahydrofuran:methanol=1:1, and sodium methoxide (8.49 mg) was added, followed by stirring at room temperature for 2 hours. The solution was neutralized by adding a cation exchange resin, Dowex 50WX-8 (H$^+$) (Dow Chemical Co.). The ion exchange resin was filtered off, and the filtrate was concentrated under reduced pressure and recrystallized from ethanol to give the target compound (270 mg). O-lactosyl-N-(6-acryloylamino)caproylserine octylamide had the following structural formula.

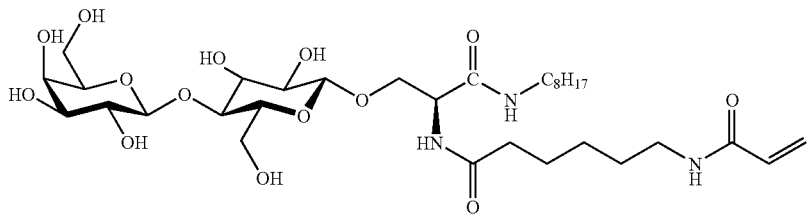

Example 26

Synthesis of O-lactosyl-N-(6-acryloylamino)caproylserine octylamide/acrylic acid/acrylamide copolymer (Copolymerization Ratio=1:2:7, Sugar Chain-Having Polymer T)

To a solution of the O-lactosyl-N-(6-acryloylamino)caproylserine octylamide (70.8 mg) obtained in Reference Example 35, acrylic acid (14.4 mg) and acrylamide ('49.8 mg) in appropriate amount of mixed solvent of DMSO:water=1:1 were added TEMED (12 μl) and ammonium peroxodisulfate (7.67 mg), followed by polymerization at 50° C. overnight. The target compound was purified by gel filtration chromatography on Sephadex G-25 (Pharmacia) column pre-equilibrated with distilled water. The fraction containing the target compound was lyophilized to afford the target compound (117 mg). The O-lactosyl-N-(6-acryloylamino)caproylserine octylamide residues in the obtained polymer had the following structural formula.

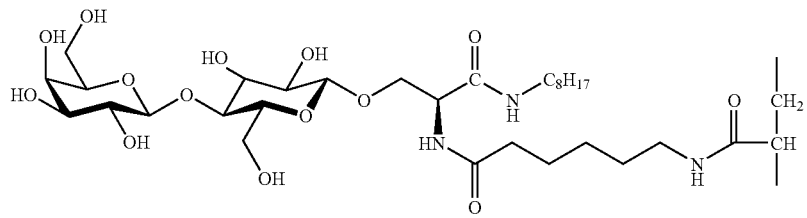

Reference Example 36

Synthesis of
O-lactosyl-N-(6-acryloylamino)caproylserine
octylamide/acrylamide copolymer
(Copolymerization Ratio=1:9, Sugar Chain-Having
Polymer U)

A reaction was carried out in the same manner as in Example 26, except for using 64.0 mg of acrylamide in place of 14.4 mg of acrylic acid and 49.8 mg of acrylamide, to afford the target compound (105 mg).

Example 27

Sialic Acid Transfer to Sugar Chain-Having Polymers T and U by Immobilized α2,3-sialyltransferase 0.5 ml of the immobilized α2,3-sialyltransferase obtained in Reference Example 10, and either 13.5 mg of sugar chain-having polymer T obtained in Example 28 or 16.4 mg of sugar chain-having polymer U were incubated in 50 mM sodium cacodylate buffer (1.0 ml, pH 7.0) containing 50 mM CMP-NeuAc and 10 mM manganese chloride at 30° C. for 24 hours. After the incubation, the immobilized α2,3-sialyltransferase was removed by centrifugation, and the obtained reaction mixture was subjected to column chromatography on Sephadex G-25 (Pharmacia) (eluant: 50 mM ammonium formate), the eluate was then lyophilized. Thus, two products were obtained in amounts of 14 mg and 12 mg, respectively. The H-NMR spectra of the obtained products were measured, and the conversions of the sialic acid transfer reactions were compared. The results were that the conversion of sugar chain-having polymer T was about 90%, whereas that of sugar chain-having polymer U was about 70%. The O-lactosyl-N-(6-acryloylamino)caproylserine octylamide residues in the polymer containing transferred sialic acid had the following structural formula.

Example 28

Comparison of Recoveries of Sugar Chain-Having Polymers by Gel Filtration Chromatography A solution of either sugar chain-having polymer S or T (10 mg) containing transferred sialic acid obtained in Example 27 in 50 mM sodium cacodylate buffer (2.0 ml, pH 7.0) containing 50 mM CMP-NeuAc and 10 mM manganese chloride was subjected to column chromatography on Sephadex G-25 (Pharmacia) (eluant: 50 mM ammonium formate), and recovered the sugar chain-having polymer. The recoveries of the two polymers were compared. The results were that the recovery of sugar chain-having polymer S was 87%, whereas that of sugar chain-having polymer T was 77%, showing that the recovery of sugar chain-having polymer S was superior.

Example 29

Sugar Chain Transfer from Sugar Chain-Having Polymer To N-stearoylsphingosine Using Ceramide Glycanase Leech-derived ceramide glycanase (0.01 U) was added to 50 mM citric acid buffer (1.0 ml, pH 6.0) containing 10 mg of the sugar chain-having polymer containing transferred sialic acid obtained in Example 27, 25 mg of N-stearoylsphingosine and 20 μl of triton CF-54, followed by incubating at 37° C. for 17 hours. After the incubation, a product was separated by column chromatography on Sephadex LH-20 (Pharmacia) column equilibrated with chloroform:methanol:water=60:30:5. The fraction containing the product was evaporated to afford the product (6 mg). HPLC analysis revealed that the product was 1-O—(N-acetylneuraminyl-α-(2→3))lactosyl-N-stearoylsphingosine. 1-O—(N-acetylneuraminyl-α-(2→3))lactosyl-N-stearoylsphingosine had the following structural formula, wherein Ac is an acetyl group.

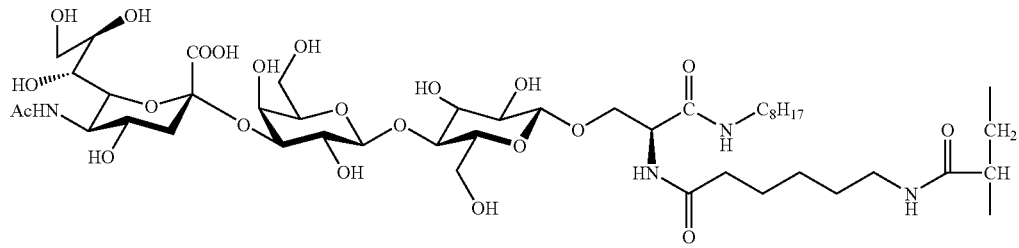

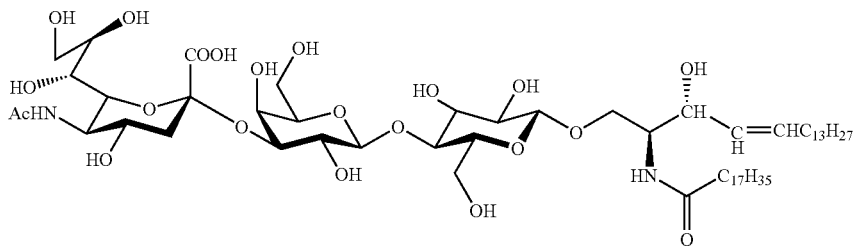

INDUSTRIAL APPLICABILITY

Use of the sugar chain-having polymer of the present invention for glycoconjugate synthesis enables easy and efficient synthesis of various glycoconjugates, for example, oligosaccharides, glycopeptides, glycolipids and glycosides. The obtained glycoconjugates have various physiological activities, and are therefore expected to find applications in medicines and other fields.

The invention claimed is:

1. A water-soluble vinyl-based polymer compound comprising:
   (i) 20 to 80 mol % of (meth)acrylic acid residue;
   (ii) 0.1 to 50 mol % of a first vinyl monomer residue comprising a sugar chain and a linker, the sugar chain comprising a monosacharide or an oligosaccharide residue and the linker comprising a selectively cleavable bond; and
   (iii) at least a second vinyl monomer residue different from the (meth)acrylic acid residue and the first vinyl monomer residue.

2. A compound according to claim 1, further comprising amino acid or peptide residues bound to the monosaccharide or oligosaccharide residues.

3. A compound according to claim 1, wherein the first vinyl monomer residue is selected from the group consisting of acrylamide derivatives, methacrylamide derivatives, acrylic esters, methacrylic esters, styrene derivatives and fatty-acid vinyl esters.

4. A compound according to claim 1, wherein the selectively cleavable bond contained in the linker can be cleaved by hydrogenolysis or by oxidation using 2,3-dichloro-5,6-dicyanobenzoquinone.

5. A compound according to claim 1, wherein the linker and the sugar chain together is a group represented by General Formula (I),

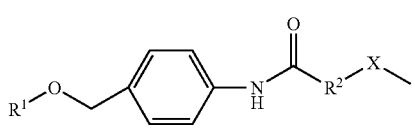

(I)

wherein $R^1$ is a monosaccharide or an oligosaccharide residue, $R^2$ is a bivalent linking group with a length equivalent to 4 to 20 methylene groups, and X is O, S, or NH.

6. A compound according to claim 5, wherein $R^1$ is an N-acetylglucosamine residue, a glucose residue or a lactose residue.

7. A compound according to claim 5, wherein $R^2$ is a pentylene group.

8. A compound according to claim 1, wherein the linker and the sugar chain together is a group represented by General Formula (II),

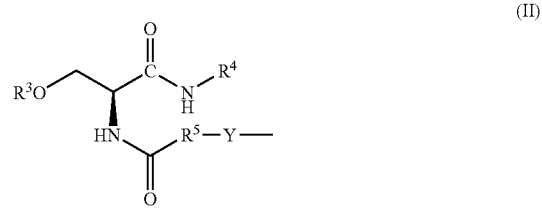

(II)

wherein $R^3$ is a monosaccharide or an oligosaccharide residue, $R^4$ is a $C_{6-20}$ alkyl or alkenyl group, $R^5$ is a bivalent linking group with a length equivalent to 5 to 19 methylene groups, and Y is O, S, or NH.

9. A compound according to claim 8, wherein $R^3$ is a glucose or lactose residue.

10. A compound according to claim 1, wherein the linker and the sugar chain together is a group represented by General Formula (III),

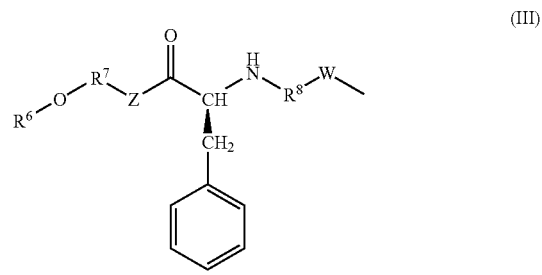

(III)

wherein $R^6$ is a monosaccharide or an oligosaccharide residue, $R^7$ is a bivalent linking group with a length equivalent to 2 to 20 methylene groups, $R^8$ is a bivalent linking group with a length equivalent to 5 to 19 methylene groups, and Z and W are each independently O, S, or NH.

11. A compound according to claim 10, wherein $R^6$ is an N-acetylglucosamine residue.

12. A compound according to claim 2, wherein the peptide residue consists of 2 to 30 amino acid residues.

13. A compound according to claim 1, wherein the selectively cleavable bond contained in the linker can be cleaved by an appropriate hydrolase.

14. A compound according to claim 13, wherein the appropriate hydrolase is ceramide glycanase or α-chymotrypsin.

15. A compound according to claim 13, wherein the appropriate hydrolase is a protease that does not have a cleavage site in an amino acid or peptide residue to which a monosaccharide or an oligosaccharide residue is bound.

16. A compound according to claim 15, wherein the linker containing a selectively cleavable bond that is linked to an amino acid or a peptide residue bound to a monosaccharide or an oligosaccharide residue is a group represented by General Formula (IV), $$-R^9-R^{10}- \quad (IV)$$

wherein $R^9$ is a bivalent linking group with a length equivalent to 1 to 20 methylene groups and is linked to the water-soluble polymer compound, and $R^{10}$ is an amino acid or a peptide residue containing a cleavable site by an appropriate protease and is bound to a monosaccharide or an oligosaccharide residue, and that the monosaccharide or oligosaccharide residue is bound to a side chain functional group of Asn, Asp, Cys, Gln, Glu, Lys, Ser, Thr or Tyr residue, or to a side chain functional group of the amino acid residue in a peptide residue directly or through a bivalent linking group via a glycosidic bond.

17. A compound according to claim 16, wherein $R^9$ is a group represented by General Formula (V), $$-A-(CH_2)_n-CO- \quad (V)$$

wherein A is O, $CH_2$, C=O, or NH, the group is linked to a side chain of the water-soluble polymer through A, and n is an integer from 1 to 18.

18. A compound according to claim 16, wherein the bivalent linking group bound to the side chain functional group is a group with a length equivalent to 1 to 20 methylene groups.

19. A compound according to claim 16, wherein the bivalent linking group linked to the side chain functional group is a group represented by General Formula (VI), $$-B-(CH_2)_n-O- \quad (VI)$$

wherein B is O, NH, or C=O, the group is linked to the side chain functional group of an amino acid residue through B, and n is an integer from 1 to 18.

20. A water-soluble polymer primer for glycoconjugate synthesis comprising a water-soluble vinyl-based polymer compound according to claim 1.

21. A method for producing a water-soluble vinyl-based polymer compound having sugar chain(s) comprising a step of copolymerization of (meth)acrylic acid, a (meth)acrylamide derivative represented by General Formula (VII),

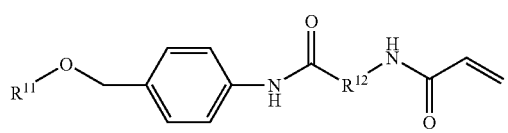

wherein $R^{11}$ is a monosaccharide or an oligosaccharide residue, and $R^{12}$ is a bivalent linking group with a length equivalent to 4 to 20 methylene groups, and at least one vinyl monomer different from the (meth)acrylic acid and the (meth)acrylamide derivative in such manner that the proportions of the (meth)acrylic acid and the (meth)acrylamide derivative in the total vinyl-based polymer are 20 to 80 mol % and 0.1-50 mol %, respectively.

22. A method according to claim 21, wherein $R^{11}$ is an N-acetylglucosamine residue, a glucose residue, or a lactose residue.

23. A method according to claim 21, wherein $R^{12}$ is a pentylene group.

24. A method according to claim 21, wherein the vinyl monomer is at least one monomer selected from the group consisting of acrylamide derivatives, methacrylamide derivatives, acrylic esters, methacrylic acid esters, styrene derivatives, and fatty acid vinyl esters.

25. A method for producing a glycoconjugate comprising the steps of:
transferring a sugar residue from a sugar nucleotide to a polymer compound by contacting a water-soluble vinyl-based polymer compound of claim 1 with a glycosyltransferase in the presence of a sugar nucleotide,
elongating the sugar chain by repeating the transferring step two or more times if necessary,
removing by-product nucleotides or unreacted sugar nucleotides if necessary, and
after repeating the above steps two or more times, releasing the resultant glycoconjugate sugar chain from the water-soluble polymer compound which binds the sugar chain elongated by the transfer of the plurality of sugar residues.

26. A method for producing a glycoconjugate comprising the steps of:
transferring a sugar residue from a sugar nucleotide to a water-soluble polymer compound by the action of a glycosyltransferase to the water-soluble vinyl-based polymer compound of claim 8 in the presence of a sugar nucleotide,
elongating the sugar chain by repeating the transferring step two or more times if necessary,
removing by-product nucleotides or unreacted sugar nucleotides if necessary and
after repeating the above steps two or more times, transferring the resultant oligosaccharide elongated by transfer of the plurality of sugar residues from the water-soluble polymer compound to ceramide by the action of ceramide glycanase in the presence of ceramide.

27. A compound according to claim 1, wherein the second vinyl monomer residue is selected from the group consisting of acrylamide derivatives, methacrylamide derivatives, hydroxyalkyl esters of acrylic acid, dimethylaminoalkyl esters of acrylic acid, hydroxyalkyl esters of methacrylic acid, and dimethylaminoalkyl esters of methacrylic acid.

28. A compound according to claim 1, wherein the compound comprises 10 to 70 mol % of the second vinyl monomer residue.

29. A compound according to claim 1, wherein the (meth)acrylic acid residue is selected from the group consisting acrylic acid and salts thereof, and methacrylic acid and salts thereof.

* * * * *